United States Patent

Moser et al.

(10) Patent No.: US 8,979,646 B2
(45) Date of Patent: Mar. 17, 2015

(54) CASINO PATRON TRACKING AND INFORMATION USE

(75) Inventors: Timothy Moser, Las Vegas, NV (US);
Dwayne Nelson, Las Vegas, NV (US);
Richard Williams, Reno, NV (US);
Rick Rowe, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1107 days.

(21) Appl. No.: 11/565,424

(22) Filed: Nov. 30, 2006

(65) Prior Publication Data

US 2007/0087834 A1 Apr. 19, 2007

Related U.S. Application Data

(63) Continuation-in-part of application No. 10/170,278, filed on Jun. 12, 2002, now Pat. No. 7,311,605.

(51) Int. Cl.
*A63F 9/24* (2006.01)
*A63F 13/00* (2014.01)
(Continued)

(52) U.S. Cl.
CPC ............... *G06Q 30/02* (2013.01); *G07F 17/32* (2013.01); *G07F 17/322* (2013.01); *G07F 17/3223* (2013.01); *G07F 17/3227* (2013.01);
(Continued)

(58) Field of Classification Search
USPC ........................................................... 463/42
See application file for complete search history.

(56) References Cited

U.S. PATENT DOCUMENTS 4,335,809 A * 6/1982 Wain ............................. 463/20
4,359,633 A 11/1982 Bianco
(Continued)

FOREIGN PATENT DOCUMENTS

DE 19855117 5/2000
EP 0360613 4/1995
(Continued)

OTHER PUBLICATIONS

EPO Application No. 03 760 364.4-2221, Communication regarding Examination, dated May 20, 2005.
(Continued)

*Primary Examiner* — Kevin Y Kim
(74) *Attorney, Agent, or Firm* — Neal, Gerber & Eisenberg LLP

(57) ABSTRACT

Methods and devices are described that allow a casino to dynamically service patrons. The dynamic systems and methods collect data related to the behavior of multiple people in a gaming establishment, and collect data for entertainment resources in the gaming establishment, such as gaming devices and services. The data may be flexibly used. In one embodiment, a person is at least partially identified in the casino. The gaming establishment uses a model that selects tailor offerings for a person, such as advertisements for services that the person may enjoy or games on gaming machines that the person may enjoy. The model selects a tailored offering for the person based on the at least partial identification and the data previously obtained for multiple people and entertainment resources. The identification, selection and offering may be performed in real time. In another embodiment, the gaming establishment uses the data to reconfigure its entertainment resources to better deploy its resources relative to the behavior of people in that specific gaming establishment.

31 Claims, 11 Drawing Sheets

(51) Int. Cl.
   *G06F 17/00* (2006.01)
   *G06F 19/00* (2011.01)
   *G06Q 30/02* (2012.01)
   *G07F 17/32* (2006.01)

(52) U.S. Cl.
   CPC ........ *G07F17/3237* (2013.01); *G07F 17/3239* (2013.01); *G07F 17/3255* (2013.01)
   USPC .................. 463/29; 463/40; 463/41; 463/42; 463/43

(56) References Cited

U.S. PATENT DOCUMENTS

| | | | |
|---|---|---|---|
| 4,669,730 A | 6/1987 | Small | |
| 4,764,666 A * | 8/1988 | Bergeron | 463/25 |
| 4,856,787 A | 8/1989 | Itkis | |
| 5,129,652 A * | 7/1992 | Wilkinson | 273/139 |
| 5,169,155 A | 12/1992 | Soules et al. | |
| 5,257,179 A * | 10/1993 | DeMar | 463/25 |
| 5,258,837 A * | 11/1993 | Gormley | 348/441 |
| 5,265,874 A | 11/1993 | Dickinson et al. | |
| 5,290,033 A | 3/1994 | Bittner et al. | |
| 5,318,298 A | 6/1994 | Kelly et al. | |
| 5,321,241 A | 6/1994 | Craine | |
| 5,326,104 A | 7/1994 | Pease et al. | |
| 5,373,440 A | 12/1994 | Cohen et al. | |
| 5,557,086 A | 9/1996 | Schulze et al. | |
| 5,581,257 A | 12/1996 | Greene et al. | |
| 5,586,936 A | 12/1996 | Bennett et al. | |
| 5,643,086 A | 7/1997 | Alcorn et al. | |
| 5,655,961 A | 8/1997 | Acres et al. | |
| 5,702,304 A | 12/1997 | Acres et al. | |
| 5,722,891 A | 3/1998 | Inoue | |
| 5,741,183 A | 4/1998 | Acres et al. | |
| 5,741,184 A | 4/1998 | Takemoto et al. | |
| 5,743,798 A | 4/1998 | Adams et al. | |
| 5,752,882 A | 5/1998 | Acres et al. | |
| 5,761,647 A | 6/1998 | Boushy | |
| 5,768,382 A | 6/1998 | Schneier et al. | |
| 5,770,533 A * | 6/1998 | Franchi | 463/42 |
| 5,816,918 A | 10/1998 | Kelly et al. | |
| 5,820,459 A | 10/1998 | Acres et al. | |
| 5,823,879 A * | 10/1998 | Goldberg et al. | 463/42 |
| 5,833,540 A | 11/1998 | Miodunski et al. | |
| 5,836,817 A | 11/1998 | Acres et al. | |
| 5,871,398 A | 2/1999 | Schneier et al. | |
| 5,876,284 A | 3/1999 | Acres et al. | |
| 5,892,661 A | 4/1999 | Stafford et al. | |
| 5,951,397 A | 9/1999 | Dickinson | |
| 5,952,922 A | 9/1999 | Shober | |
| 5,967,896 A | 10/1999 | Jorasch et al. | |
| 5,971,271 A * | 10/1999 | Wynn et al. | 463/42 |
| 5,977,913 A | 11/1999 | Christ | |
| 5,988,501 A | 11/1999 | Murakami et al. | |
| 6,003,013 A | 12/1999 | Boushy et al. | |
| 6,019,283 A | 2/2000 | Lucero | |
| 6,048,269 A | 4/2000 | Burns et al. | |
| 6,048,271 A | 4/2000 | Barcelou | |
| 6,089,975 A | 7/2000 | Dunn | |
| 6,104,815 A | 8/2000 | Alcorn et al. | |
| 6,106,396 A | 8/2000 | Alcorn et al. | |
| 6,110,041 A * | 8/2000 | Walker et al. | 463/20 |
| 6,113,495 A * | 9/2000 | Walker et al. | 463/42 |
| 6,135,884 A | 10/2000 | Hedrick et al. | |
| 6,142,876 A | 11/2000 | Cumbers | |
| 6,144,332 A * | 11/2000 | Reindl et al. | 342/42 |
| 6,149,522 A | 11/2000 | Alcorn et al. | |
| 6,161,743 A | 12/2000 | Shoemaker, Jr. | |
| 6,162,122 A | 12/2000 | Acres et al. | |
| 6,165,071 A | 12/2000 | Weiss | |
| 6,183,362 B1 | 2/2001 | Boushy | |
| 6,186,893 B1 * | 2/2001 | Walker et al. | 463/20 |
| 6,193,156 B1 | 2/2001 | Han et al. | |
| 6,193,608 B1 | 2/2001 | Walker et al. | |
| 6,203,430 B1 * | 3/2001 | Walker et al. | 463/20 |
| 6,210,279 B1 | 4/2001 | Dickinson | |
| 6,234,900 B1 | 5/2001 | Cumbers | |
| 6,244,958 B1 | 6/2001 | Acres | |
| 6,254,006 B1 | 7/2001 | Mish | |
| 6,254,483 B1 * | 7/2001 | Acres | 463/26 |
| 6,265,977 B1 | 7/2001 | Vega et al. | |
| 6,267,671 B1 | 7/2001 | Hogan | |
| 6,280,326 B1 | 8/2001 | Saunders | |
| 6,285,295 B1 | 9/2001 | Casden | |
| 6,293,866 B1 | 9/2001 | Walker et al. | |
| 6,302,793 B1 * | 10/2001 | Fertitta et al. | 463/25 |
| 6,319,122 B1 | 11/2001 | Packes et al. | |
| 6,319,125 B1 | 11/2001 | Acres | |
| 6,329,213 B1 | 12/2001 | Tuttle et al. | |
| 6,358,149 B1 * | 3/2002 | Schneider et al. | 463/27 |
| 6,379,247 B1 | 4/2002 | Walker et al. | |
| 6,383,076 B1 | 5/2002 | Tiedeken | |
| 6,394,907 B1 | 5/2002 | Rowe | |
| 6,398,649 B1 | 6/2002 | Sugaya | |
| 6,400,272 B1 | 6/2002 | Holtzman et al. | |
| 6,409,595 B1 | 6/2002 | Uihlein et al. | |
| 6,419,190 B1 | 7/2002 | Nguegang | |
| 6,424,884 B1 | 7/2002 | Brooke, Jr. et al. | |
| 6,431,983 B2 | 8/2002 | Acres | |
| 6,471,590 B2 | 10/2002 | Saunders | |
| 6,514,140 B1 | 2/2003 | Storch | |
| 6,547,664 B2 | 4/2003 | Saunders | |
| 6,554,705 B1 | 4/2003 | Cumbers | |
| 6,558,256 B1 | 5/2003 | Saunders | |
| 6,571,216 B1 * | 5/2003 | Garg et al. | 705/14.25 |
| 6,606,744 B1 * | 8/2003 | Mikurak | 717/174 |
| 6,612,575 B1 | 9/2003 | Cole et al. | |
| 6,612,928 B1 | 9/2003 | Bradford et al. | |
| 6,628,939 B2 | 9/2003 | Paulsen | |
| 6,629,019 B2 | 9/2003 | Legge et al. | |
| 6,641,035 B1 | 11/2003 | Predescu et al. | |
| 6,641,484 B2 * | 11/2003 | Oles et al. | 463/47 |
| 6,675,152 B1 | 1/2004 | Prasad et al. | |
| 6,682,421 B1 | 1/2004 | Rowe et al. | |
| 6,712,698 B2 | 3/2004 | Paulsen et al. | |
| 6,778,820 B2 | 8/2004 | Tendler | |
| 6,811,486 B1 | 11/2004 | Luciano, Jr. | |
| 6,812,824 B1 | 11/2004 | Goldinger et al. | |
| 6,813,609 B2 | 11/2004 | Wilson | |
| 6,848,995 B1 * | 2/2005 | Walker et al. | 463/25 |
| 6,852,031 B1 | 2/2005 | Rowe | |
| 6,878,062 B2 | 4/2005 | Bjorklund et al. | |
| 6,884,173 B2 * | 4/2005 | Gauselmann | 463/42 |
| 6,887,154 B1 | 5/2005 | Luciano, Jr. et al. | |
| 6,912,398 B1 | 6/2005 | Domnitz | |
| 6,920,561 B1 | 7/2005 | Gould et al. | |
| 6,923,721 B2 | 8/2005 | Luciano et al. | |
| 6,923,724 B2 | 8/2005 | Williams | |
| 6,935,958 B2 | 8/2005 | Nelson | |
| 7,022,017 B1 | 4/2006 | Halbritter et al. | |
| 7,025,674 B2 | 4/2006 | Adams et al. | |
| 7,083,518 B2 * | 8/2006 | Rowe | 463/29 |
| 7,094,149 B2 * | 8/2006 | Walker et al. | 463/25 |
| 7,116,987 B2 | 10/2006 | Spain, Jr. et al. | |
| 7,116,988 B2 | 10/2006 | Dietrich et al. | |
| 7,175,528 B1 | 2/2007 | Cumbers | |
| 7,303,475 B2 * | 12/2007 | Britt et al. | 463/42 |
| 7,311,605 B2 | 12/2007 | Moser et al. | |
| 7,485,040 B2 | 2/2009 | Walker et al. | |
| 7,946,917 B2 | 5/2011 | Kaminkow et al. | |
| 8,480,466 B2 | 7/2013 | Muir et al. | |
| 8,491,392 B2 | 7/2013 | Baerlocher | |
| 2002/0034978 A1 | 3/2002 | Legge et al. | |
| 2002/0077173 A1 | 6/2002 | Luciano et al. | |
| 2002/0077174 A1 | 6/2002 | Luciano et al. | |
| 2002/0077175 A1 | 6/2002 | Jorasch et al. | |
| 2002/0107715 A1 | 8/2002 | Pace et al. | |
| 2002/0123376 A1 | 9/2002 | Walker et al. | |
| 2002/0128057 A1 | 9/2002 | Walker et al. | |
| 2002/0142825 A1 * | 10/2002 | Lark et al. | 463/16 |
| 2002/0142841 A1 | 10/2002 | Boushy | |
| 2002/0169021 A1 | 11/2002 | Urie et al. | |
| 2002/0187834 A1 | 12/2002 | Rowe et al. | |
| 2002/0194619 A1 | 12/2002 | Chang et al. | |

(56) References Cited

U.S. PATENT DOCUMENTS

| | | | |
|---|---|---|---|
| 2002/0198775 A1* | 12/2002 | Ryan | 705/14 |
| 2003/0027635 A1 | 2/2003 | Walker et al. | |
| 2003/0032471 A1 | 2/2003 | Darder | |
| 2003/0032474 A1 | 2/2003 | Kaminkow | |
| 2003/0036425 A1 | 2/2003 | Kaminkow et al. | |
| 2003/0045354 A1 | 3/2003 | Giobbi | |
| 2003/0069071 A1 | 4/2003 | Britt et al. | |
| 2003/0078101 A1* | 4/2003 | Schneider et al. | 463/42 |
| 2003/0083943 A1 | 5/2003 | Adams et al. | |
| 2003/0104865 A1 | 6/2003 | Itkis et al. | |
| 2003/0162593 A1 | 8/2003 | Griswold | |
| 2003/0195037 A1 | 10/2003 | Vuong | |
| 2003/0199321 A1 | 10/2003 | Williams | |
| 2003/0232647 A1 | 12/2003 | Moser | |
| 2004/0092307 A1 | 5/2004 | George et al. | |
| 2004/0254005 A1 | 12/2004 | Shackleford et al. | |
| 2005/0012818 A1 | 1/2005 | Kiely et al. | |
| 2005/0051965 A1 | 3/2005 | Gururajan et al. | |
| 2005/0054439 A1 | 3/2005 | Rowe et al. | |
| 2005/0116020 A1 | 6/2005 | Smolucha | |
| 2005/0143169 A1 | 6/2005 | Nguyen et al. | |
| 2005/0215315 A1 | 9/2005 | Miller et al. | |
| 2005/0255919 A1 | 11/2005 | Nelson | |
| 2006/0040741 A1 | 2/2006 | Griswold et al. | |
| 2006/0046842 A1 | 3/2006 | Mattice | |
| 2006/0052169 A1 | 3/2006 | Britt et al. | |
| 2006/0076401 A1 | 4/2006 | Frerking | |
| 2006/0084488 A1 | 4/2006 | Kinsley et al. | |
| 2006/0148561 A1 | 7/2006 | Moser et al. | |
| 2006/0252521 A1 | 11/2006 | Gururajan et al. | |
| 2006/0252554 A1 | 11/2006 | Gururajan et al. | |
| 2006/0258427 A1 | 11/2006 | Rowe | |
| 2006/0258442 A1 | 11/2006 | Ryan | |
| 2007/0117623 A1 | 5/2007 | Nelson et al. | |
| 2007/0271113 A1 | 11/2007 | Nelson | |
| 2008/0051193 A1 | 2/2008 | Kaminkow et al. | |
| 2008/0248849 A1 | 10/2008 | Lutnick et al. | |
| 2009/0055204 A1 | 2/2009 | Pennington | |
| 2009/0055205 A1 | 2/2009 | Nguyen | |

FOREIGN PATENT DOCUMENTS

| | | |
|---|---|---|
| EP | 0762341 | 12/1997 |
| EP | 1096438 | 2/2001 |
| EP | 1139310 | 4/2001 |
| EP | 1 120 757 | 8/2001 |
| EP | 1 351 180 | 10/2003 |
| FR | 2 711 001 | 4/1995 |
| FR | 2 816 742 | 5/2002 |
| JP | 2007-505079 | 6/1995 |
| JP | 11-019330 | 1/1999 |
| JP | 2000-210464 | 8/2000 |
| JP | 2002-074506 | 3/2002 |
| JP | 2002-078954 | 3/2002 |
| WO | WO 95/24689 | 9/1995 |
| WO | WO 96/00950 | 1/1996 |
| WO | WO 98/12648 | 3/1998 |
| WO | WO 98/47589 | 10/1998 |
| WO | WO 00/38089 | 6/2000 |
| WO | WO 00/52655 | 9/2000 |
| WO | WO 00/78419 | 12/2000 |
| WO | WO 01/46923 | 6/2001 |
| WO | WO 02/058020 | 7/2002 |
| WO | WO 03/013678 | 2/2003 |
| WO | WO 03/025828 | 3/2003 |
| WO | WO 03/027970 | 4/2003 |
| WO | WO 03/073386 | 9/2003 |
| WO | WO 03/089088 | 10/2003 |
| WO | WO 03/107287 | 12/2003 |
| WO | WO 2004/013820 | 2/2004 |
| WO | WO 2004/052656 | 6/2004 |
| WO | WO 2004/064354 | 7/2004 |
| WO | WO 2005/098650 | 10/2005 |
| WO | WO 2006/020413 | 2/2006 |
| WO | WO 2006/105182 | 10/2006 |
| WO | WO 2008/067212 | 6/2008 |
| WO | WO 2008/091473 | 7/2008 |
| WO | WO 2009/026180 | 2/2009 |
| WO | WO 2009/026295 | 2/2009 |

OTHER PUBLICATIONS

EP patent application No. 03760364.4-2221, Preliminary Opinion dated May 10, 2006.

Electronics Now, Whats News, 'In-Charge Cards', Aug. 1993, p. 4.

US Office Action, mailed Mar. 2, 2004, from U.S. Appl. No. 10/170,278.

US Office Action, mailed Sep. 9, 2004, from U.S. Appl. No. 10/170,278.

US Office Action, mailed Jan. 11, 2007, from U.S. Appl. No. 10/170,278.

US Office Action, mailed Jan. 25, 2007, from U.S. Appl. No. 11/303,444.

Bronstein et al "Robust expression-invariant face recognition from partially missing data", Computer Vision-ECCV 2006, ISBN 3-540-33836-5, Jul. 2006, pp. 396-408.

EPCglobal Architecture Framework, Final Version, Jul. 1, 2005, 53 pp.

U.S. Final Office Action dated Sep. 19, 2002 issued in U.S. Appl. No. 09/927,742.

U.S. Final Office Action dated Mar. 10, 2003 issued in U.S. Appl. No. 09/927,742.

U.S. Advisory Action dated May 27, 2003 issued in U.S. Appl. No. 09/927,742.

U.S. Office Action dated Aug. 20, 2003 issued in U.S. Appl. No. 09/927,742.

U.S. Final Office Action dated Mar. 20, 2007 issued in U.S. Appl. No. 09/927,742.

U.S. Advisory Action dated Jun. 21, 2007 issued in U.S. Appl. No. 09/927,742.

U.S. Office Action dated Sep. 20, 2007 issued in U.S. Appl. No. 09/927,742.

U.S. Final Office Action dated Jun. 9, 2008 issued in U.S. Appl. No. 09/927,742.

U.S. Office Action dated Nov. 12, 2008 issued in U.S. Appl. No. 09/927,742.

U.S. Final Office Action dated Apr. 17, 2009 issued in U.S. Appl. No. 09/927,742.

U.S. Advisory Action dated Jun. 26, 2009 issued in U.S. Appl. No. 09/927,742.

U.S. Office Action dated Jul. 23, 2009 issued in U.S. Appl. No. 09/927,742.

U.S. Notice of Allowance dated Apr. 16, 2010 issued in U.S. Appl. No. 09/927,742.

U.S. Notice of Allowance dated Sep. 7, 2010 issued in U.S. Appl. No. 09/927,742.

U.S. Notice of Allowance dated Jan. 6, 2011 issued in U.S. Appl. No. 09/927,742.

U.S. Notice of Allowance dated May 3, 2011 issued in U.S. Appl. No. 09/927,742.

U.S. Office Action dated Oct. 4, 2005 issued in U.S. Appl. No. 10/214,936.

U.S. Final Office Action dated Jun. 30, 2006 issued in U.S. Appl. No. 10/214,936.

U.S. Office Action dated Oct. 31, 2006 iissued in U.S. Appl. No. 10/214,936.

U.S. Final Office Action dated Apr. 24, 2007 issued in U.S. Appl. No. 10/214,936.

U.S. Office Action dated Sep. 5, 2007 issued in U.S. Appl. No. 10/214,936.

U.S. Final Office Action dated Jun. 12, 2008 issued in U.S. Appl. No. 10/214,936.

U.S. Office Action dated Dec. 23, 2008 issued in U.S. Appl. No. 10/214,936.

U.S. Final Office Action dated Aug. 21, 2009 issued in U.S. Appl. No. 10/214,936.

(56) References Cited

OTHER PUBLICATIONS

U.S. Office Action dated Jun. 25, 2010 issued in U.S. Appl. No. 10/214,936.
U.S. Notice of Allowance, Examiner Amendment and Interview Summary dated Dec. 13, 2010 issued in U.S. Appl. No. 10/214,936.
U.S. Notice of Allowance dated Apr. 1, 2011 issued in U.S. Appl. No. 10/214,936.
U.S. Office Action dated May 28, 2008 issued in U.S. Appl. No. 11/830,739.
U.S. Final Office Action dated Feb. 19, 2009 issued in U.S. Appl. No. 11/830,739.
U.S. Final Office Action dated Aug. 19, 2009 issued in U.S. Appl. No. 11/830,739.
U.S. Notice of Allowance dated Aug. 23, 2010 issued in U.S. Appl. No. 11/830,739.
U.S. Office Communication dated Sep. 29, 2010 considering IDS references issued in U.S. Appl. No. 11/830,739.
U.S. Notice of Allowance, Interview Summary, and Examiner's Amendment dated Dec. 29, 2010 issued in U.S. Appl. No. 11/830,739.
U.S. Notice of Allowance dated Apr. 15, 2011 issued in U.S. Appl. No. 11/830,739.
U.S. Office Action dated Oct. 16, 2009 issued in U.S. Appl. No. 11/262,059.
U.S. Final Office Action dated Mar. 8, 2010 issued in U.S. Appl. No. 11/262,059.
U.S. Office Action dated Oct. 5, 2007 issued in U.S. Appl. No. 10/914,944.
U.S. Office Action dated Apr. 16, 2008 issued in U.S. Appl. No. 10/914,944.
U.S. Office Action dated Apr. 22, 2009 issued in U.S. Appl. No. 10/914,944.
U.S. Final Office Action dated Dec. 7, 2009 issued in U.S. Appl. No. 10/914,944.
U.S. Advisory Action dated Mar. 15, 2010 issued in U.S. Appl. No. 10/914,944.
U.S. Office Action dated Apr. 26, 2010 fissued in U.S. Appl. No. 10/914,944.
U.S. Final Office Action dated Sep. 23, 2010 issued in U.S. Appl. No. 10/914,944.
U.S. Office Action dated Mar. 15, 2011 issued in U.S. Appl. No. 10/914,944.
U.S. Office Action, dated Apr. 4, 2005 (non-responsive) issued in U.S. Appl. No. 10/170,278.
U.S. Notice of Allowance dated Sep. 7, 2005 issued in U.S. Appl. No. 10/170,278.
US Supplemental Office Action, dated Jan. 19, 2007 issued in U.S. Appl. No. 10/170,278.
U.S. Notice of Allowance dated Aug. 7, 2007 issued in U.S. Appl. No. 10/170,278.
U.S. Office Action dated Feb. 25, 2008 issued in U.S. Appl. No. 11/655,496.
U.S. Final Office Action dated Oct. 1, 2008 issued in U.S. Appl. No. 11/655,496.
U.S. Office Action dated Jan. 26, 2009 issued in U.S. Appl. No. 11/655,496.
U.S. Final Office Action dated Feb. 5, 2010 issued in U.S. Appl. No. 11/655,496.
U.S. Office Action dated Aug. 5, 2010 issued in U.S. Appl. No. 11/655,496.
U.S. Final Office Action dated Jan. 25, 2011 issued in U.S. Appl. No. 11/655,496.
U.S. Office Action dated Dec. 1, 2010 issued in U.S. Appl. No. 11/829,028.
U.S. Final Office Action dated May 13, 2011 issued in U.S. Appl. No. 11/829,028.
U.S. Office Action dated May 31, 2011 issued in U.S. Appl. No. 11/844,267.
PCT International Search Report dated Oct. 18, 2002 issued in PCT/US2002/025105.
PCT International Preliminary Examination Report dated Jun. 11, 2003 issued in PCT/US2002/025105.
PCT International Search Report dated Mar. 2, 2004 issued in PCT/US2003/023872.
PCT Written Opinion dated Mar. 8, 2004 issued in PCT/US2003/023872.
PCT International Preliminary Examination Report dated May 27, 2004 issued in PCT/US2003/023872.
Australian Examiner's first report dated Jul. 18, 2008 issued in AU Application No. 2003257941, 3 pgs.
Great Britain Search Report dated Jul. 7, 2005 issued in GB0502535.8, 2 pages.
Great Britain Search and Examination Report dated Aug. 31, 2006 issued in GB0611551.3.
Great Britain Search and Examination Report dated Aug. 31, 2006 issued in GB0611545.5.
Japanese Office Action (description) dated Mar. 5, 2008 issued in JP2004-256237, 4 pgs.
Japanese Office Action (description) dated Dec. 8, 2008 issued in JP2004-256237, 4 pgs.
Great Britian Combined Search and Examination Report dated Feb. 15, 2007 issued in GB0620781.5 , 5 pages.
Great Britian Examination Report dated Jan. 30, 2008 issued in GB0620781.5.
Great Britian Examination Report dated Jun. 24, 2008 issued in GB0620781.5, 2 pgs.
PCT International Search Report and Written Opinion dated Nov. 15, 2005 issue in PCT/US2005/026777, 7 pages.
PCT International Preliminary Report on Patentability and Written Opinion dated Feb. 13, 2007 issued in PCT/US2005/026777.
Chinese First Office Action dated Jul. 18, 2008 issued in CN200580027057.X.
Chinese Second Office Action dated Jun. 12, 2009 issued in CN200580027057.X.
Chinese Office Action (Descision of the Office of Rejections) dated Jan. 8, 2010 issued in CN200580027057.X.
Chinese Notification of Acceptance of the Request for Reexamination dated Oct. 25, 2010 issued in CN200580027057.X.
European Examination Report dated Jan. 16, 2008 issued in EP 05 776 662.8.
PCT Written Opinion dated Jan. 15, 2004 issued in PCT/US03/18826.
PCT International Preliminary Examination Report and International Search Report dated Apr. 8, 2004 issued in PCT/US03/18826.
Australian Examiner's First Report dated Sep. 19, 2008 issued in AU200324357.
EP Decision to Refuse a European Patent Application dated Feb. 12, 2007 issued in EP 03 760 364.4.
PCT International Search Report dated Jun. 23, 2008 issued in PCT/US2007/085117.
PCT International Preliminary Report on Patentability and Written Opinion dated Jun. 11, 2009 issued in PCT/US2007/085117.
PCT International Search Report dated Jun. 23, 2008 issued in PCT/US2007/088920.
PCT Written Opinion dated Jun. 23, 2008 issued in PCT/US2007/088920.
PCT International Preliminary Report on Patentability and Written Opinion dated Jul. 30, 2009 issued in PCT/US2007/088920.
PCT International Search Report dated Nov. 7, 2008 issued in PCT/US2008/073388.
PCT Written Opinion dated Nov. 7, 2008 issued in PCT/US2008/073388.
PCT International Preliminary Report on Patentability and Written Opinion dated Feb. 24, 2010 issued in PCT/US2008/073388.
PCT International Search Report dated Feb. 13, 2009 issued in PCT/US2008/073599.
PCT Written Opinion dated Feb. 13, 2009 issued in PCT/US2008/073599.
PCT International Preliminary Report on Patentability and Written Opinion dated Feb. 24, 2010 issued in PCT/US2008/073599.
Bar Code 1, "2-Dimensional Bar Code Page", Adams Communication, Jun. 20, 2002, pp. 1-13. http://www.adams1.com/pub/russadam/stack.html.

(56) References Cited

OTHER PUBLICATIONS

Bar Code 1, "Bar Code Readers Page", Adams Communication, Jun. 20, 2002, pp. 1-5 http://www.adams1.com/pub/russadam/readers.html.

Bazakos et al. "Fast Access Control Technology Solutions", IEEE Conference on Advanced Video Signal Based Surveillance, Italy, Sep. 15-16, 2005.

Converting Signal Strength Percentage to dBm Values, Joe Bardwell, Nov. 2002.

Doppler Direction Finder, Radio Direction Finder Kit, Ramsey Electronics Mode No. DDF1, Copyright 1998 by Ramsey Electronics, Inc.

Dowdall et al., "A Face Detection Method Based on Multi-Band Feature Extraction in the Near-IR Spectrum," Proceedings IEEE Workshop on Computer Vision Beyond the Visiblespectrum: Methods and Applications, Dec. 14, 2001, XP002369556.

Fey, Marshall, (1983) "Slot Machines, A Pictorial History of the First 100 years", Liberty Belle Books, pp. 100-117.

Fleck et al. (Jun. 2006) "3D Surveillance—A Distributed Network of Smart Cameras for Real-Time Tracking and its Visualization in 3D", Proceedings of the 2006 Conference on Computer Vision and Pattern Recognition Workshop, CVPRW '06, 118:17-22.

Google search on the defiition of "encrypt" at: http://www.google.com/search?hl=en&rlz+1T4GGLD_e_US345&q=define%3AEncrypt, downloaded Feb. 26, 2010, 2 pages.

"Hand Held terminal-decoder for invisible bar codes", V.L. Engineering, downloaded from http://www.vlengineering.com/products/wizard_CT6.html on Nov. 23, 2004, 3 pages.

Patwari, N., et al., "Learning Sensor Location from Signal Strength and Connectivity," in Secure Localization and Time Synchronization for Wireless Sensor and Ad Hoc Networks , Eds. Radha Poovendran, Cliff Wang, and Sumit Roy, Advances in Information Security series, vol. 30, Springer, Dec. 2006, ISBN 978-0-387-3272-1, 26 pages.

Rankl, W. et al.: "Handbuch der Chipkarten, Kontaktbehaftete Karten" Handbuch Der Chipkarten. Aufbau-Funktionsweise-Einsatz Von Smart Cards, Muenchen: Carl Hanse Verlag, DE, 1999, pp. 110-125, XP002242017.

RFID "Basics Primer", "RFID Basics Primer", Automatic Identification Manufacturer; Sep. 28, 1999, pp. 1-17. http://www.aimglobal.org/technologies/rfid/resources/papers/rfid_basics_primer.htm http://www.aimglobal.org/technologies/rfid/resources/papers/rfid_basics_primer.asp downloaded Nov. 23, 2004, 14 pages.

Rowe, R., Herbst Software Presentation, Aug. 12, 2003, 16 pages.

S&H Greenpoints, Sperry & Hutchinson Company, Inc. http://www.greenpoints.com/info/inf_aboutsh.asp [downloaded Sep. 10, 2002], 10 pages.

Symbol, Wireless for Beginners, Symbol Tech, Sep. 1, 2001, 12 pages.

Symbol®, "Encoded Fingerprint Scanned by Symbol PDF417 Reader", Symbol Tech, Dec. 22, 1998, pp. 1-3. http://www.symbol.com/news/pressreleases/pressreleases_pdf417prod_ph.htm http://www.symbol.com/news/pressreleases/press_releases_pdf417prod_ph.html downloaded Nov. 23, 2004, 3 pages.

"Technology Highlight: Spread Spectrum Barcode Technology," Sandia National Laboratories, Sandia/California News, downloaded from http://www.ca.sandia.gov/news/barcode/index.html on Oct. 27, 2005, 8 pages.

"What Happened to Green Stamps", (Jul. 24, 2001) The Straight Dope, http://www.straightdope.com/mailbag/mgreenstamps.html [downloaded Sep. 1, 2002], 2 pages.

"Where's the Smart Money?", www.Economist.com downloaded from http://weblinks2.epnet.com/citation.asp?tb=1& Dec. 8, 2004, 2 pages.

\* cited by examiner

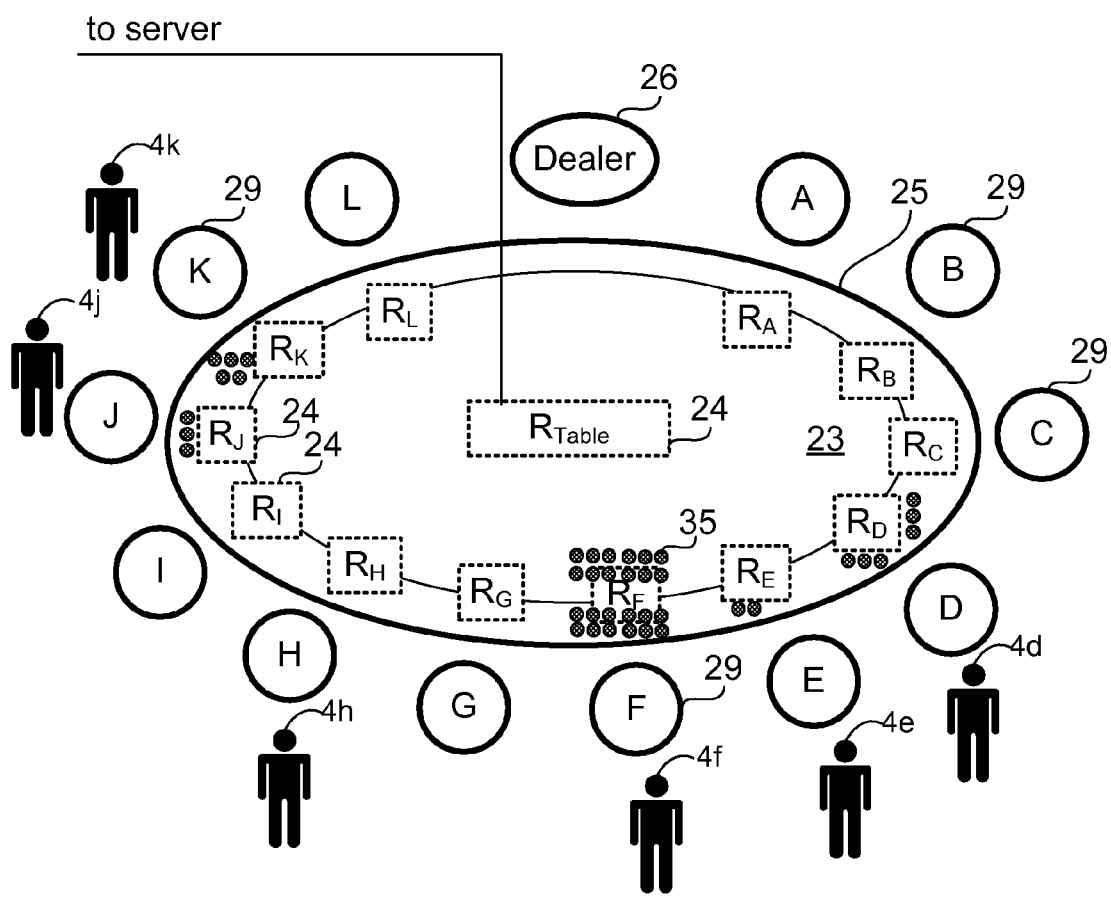
*Figure 5A*
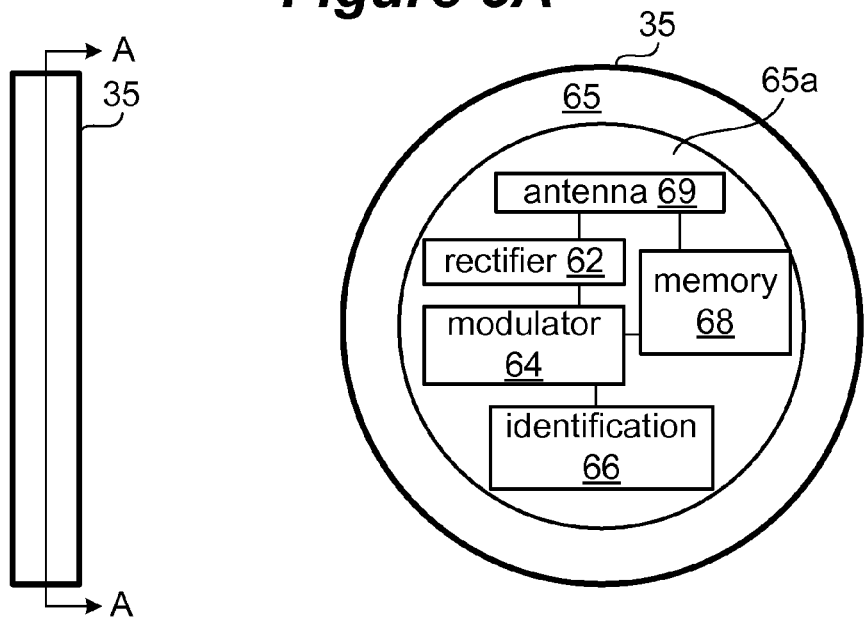
*Figure 5B*          *Figure 5C*

CASINO PATRON TRACKING AND INFORMATION USE

CROSS-REFERENCE TO RELATED APPLICATION

This application is a continuation-in-part of and claims priority under 35 U.S.C. §120 to commonly owned and co-pending of U.S. patent application Ser. No. 10/170,278 entitled "PLAYER TRACKING ASSEMBLY FOR COMPLETE PATRON TRACKING FOR BOTH GAMING AND NON-GAMING CASINO ACTIVITY," which is incorporated by reference in its entirety for all purposes.

FIELD OF THE INVENTION

The present invention relates to data collection in a gaming establishment and use of this data to better entertain patrons.

BACKGROUND OF THE INVENTION

To increase revenue, a casino offers a vast array of gaming machines and services (restaurants, shops, etc.) that patrons are likely to enjoy. The gaming machines are statically placed in the casino in anticipation of where people are likely to walk. Commonly, each gaming machine offers a single game that is, again, loaded onto the gaming machine before a person walks into the casino and nears the machine.

Frequently, a person does not know that a casino offers certain games and/or services that the person is interested in. This is particularly problematic when a person walks through a casino and does not find—or directly walk by—a static game or service that he wants. Casinos lose money when a person leaves a casino and the casino missed an opportunity to entertain that person.

SUMMARY OF THE INVENTION

The present invention provides systems and methods that allow a casino to dynamically service patrons. The dynamic systems and methods collect data related to the behavior of multiple people in a gaming establishment, and collect data for entertainment resources in the gaming establishment, such as gaming devices and services. The data may be flexibly used. In one embodiment, a person is at least partially identified in the casino. The gaming establishment uses a model that selects tailor offerings for a person, such as advertisements for services that the person may enjoy or games on gaming machines that the person may enjoy. The model selects a tailored offering for the person based on the at least partial identification and the data previously obtained for multiple people and entertainment resources. The identification, selection and offering may be performed in real time. In another embodiment, the gaming establishment uses the data to reconfigure its entertainment resources to better deploy its resources relative to the behavior of people in that specific gaming establishment.

In one aspect, the present invention relates to a method for providing a tailored offering to a person. The method includes collecting data related to the behavior of multiple people in a gaming establishment, and collecting data related to entertainment resources for the gaming establishment. The method also includes building a model for selecting a tailored offering for a person. The method further includes at least partially identifying the person. The method includes selecting a tailored offering for the person, using: a) a model configured to select a tailored offering for a person, b) using the data related to the behavior of multiple people and c) the data for entertainment resources in the gaming establishment. The method then provides the tailored offering to the person.

In another aspect, the present invention relates to a method for reconfiguring entertainment resources in the gaming establishment. The method includes collecting data related to the behavior of multiple people in a gaming establishment and collecting data related to entertainment resources for the gaming establishment. The method also includes building a model that relates the behavior of the multiple people to the entertainment resources for the gaming establishment. The method then uses the model, along with the data related to the behavior of multiple people and with the data for entertainment resources in the gaming establishment, to determine a reconfiguration for the entertainment resources in the gaming establishment that increases interaction between people and the entertainment resources in the gaming establishment.

In another aspect, the present invention relates to a central processing system for use with a gaming establishment. The central processing system includes a processor and a memory. The memory is configured to store: a) data related to the behavior of multiple people in a gaming establishment, b) data related to entertainment resources for the gaming establishment, and c) a model configured to select a tailored offering for a person, when the person is at least partially identified in the gaming establishment, using the model along with the data related to the behavior of multiple people and with the data for entertainment resources in the gaming establishment. The central processing system also includes a communications interface configured to communicate with multiple entertainment resources in the gaming establishment and to send the tailored offering to an entertainment resource near the person and in the gaming establishment.

In yet another aspect, the present invention relates to a computer readable medium that includes instructions for implemented an above-mentioned methods The foregoing aspects and implementations of the invention may be embodied in software, in hardware or otherwise. These and other features of the present invention are described below with reference to the drawings.

BRIEF DESCRIPTION OF THE DRAWINGS

FIG. 5A shows a poker table that includes wireless readers in accordance with one embodiment of the present invention.

FIGS. 5B and 5C illustrate a portable RFID token in accordance with one embodiment of the present invention.

DETAILED DESCRIPTION OF SPECIFIC EMBODIMENTS

Figure 1:
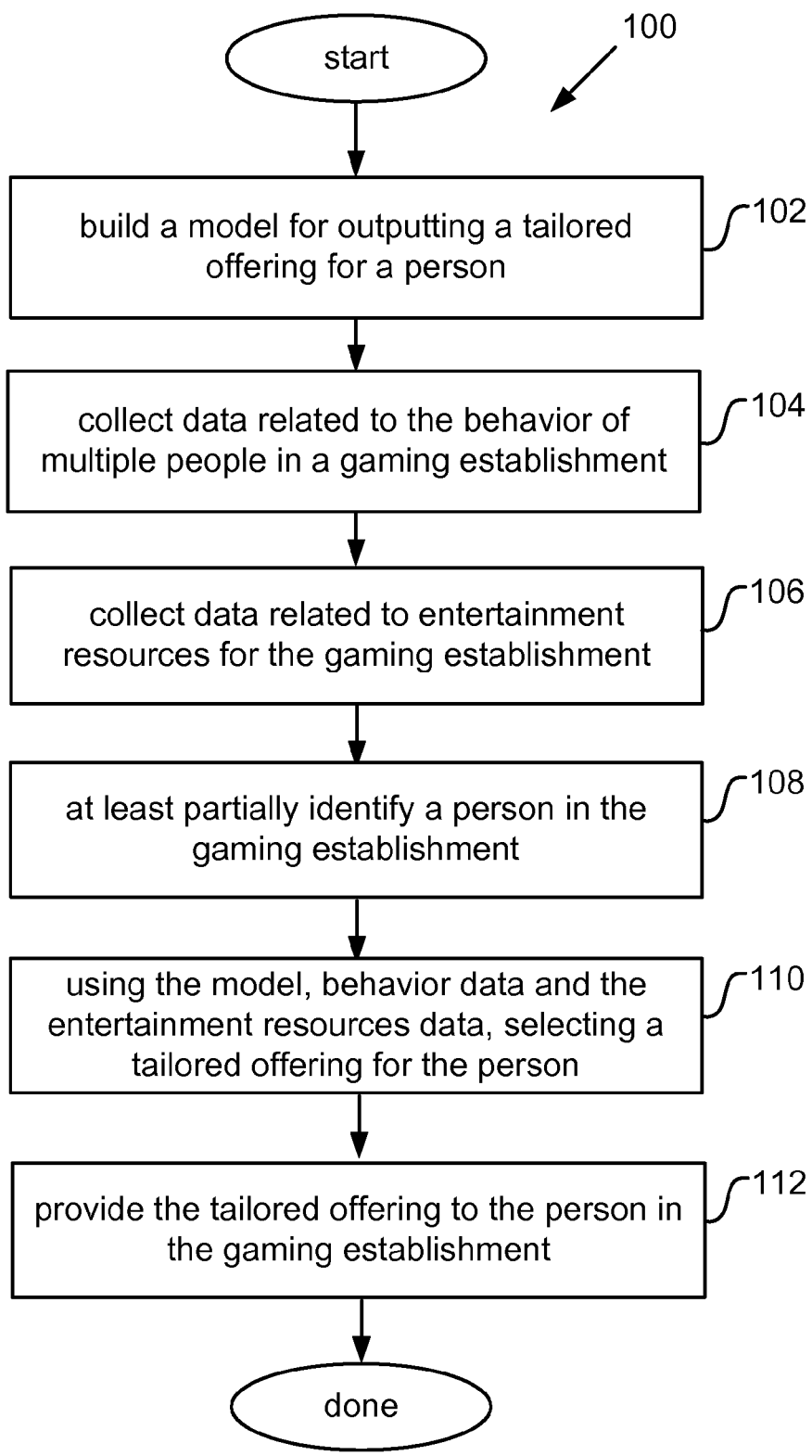
FIG. 1 shows a method 100 of providing game offerings in a gaming establishment in accordance with one embodiment of the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Systems and methods described herein improve patron tracking and data collection for gaming and non-gaming activities. The present invention then leverages the collected data to a) improve the experience for one or more patrons in a gaming establishment, and/or b) help the gaming establishment make better decisions on how to deploy its resources to improve service on a macro level.

Currently, games on gaming machines and other services in a casino do adapt in real time to the people that enter a casino. This static state of casino operation forces a casino to determine (and lay out), beforehand, gaming machines and advertisements for incoming patrons.

On the other hand, tracking and real-time servicing as described herein allows a casino or other gaming establishment to dynamically tailor the provision and advertisement of entertainment resources to one or more people in a casino. For example, a casino traffic controller or automated central server may partially or fully identify a person when he enters or as he walks into or through a casino, and then dynamically offer games, services and other entertainment resources to the person based on the identification. Partial identification means the person has not been uniquely identified and may be based on commonalities between people (e.g., they are all part of a tour group or common convention staying at a casino/hotel) or based on demographics such as age and sex. In this case, previous offerings to people of the demographic group may be used to determine what to offer a person who has only been partially identified in that demographic.

Many identification techniques are suitable for use herein. Facial recognition using cameras in a casino can identify people in real time as they enter the casino. Player tracking cards allow historical game play data to be collected with high detail. Other identification techniques are described below.

Tailored offerings may be made in real time. This permits a casino to better service a person—as the person walks through the casino—and increase revenue when the person ends up spending more money than would be spent according to static offerings.

In one embodiment, a central server tracks people and entertainment resources (e.g., gaming machines, video displays and mobile devices) in a casino for the purposes of gathering data and modeling people and entertainment resources, with the goal being to tailor offerings and promotions that increase revenue. In a specific, patron identification and data collection are automatically implemented, which allows high throughput casinos to collect data on hundreds or thousands of people on a daily basis.

The tracking of people and entertainment resources may employ wireless techniques. A mobile gaming device using a wireless communication system such as RFID may be used to passively track a patron's movement and activity in a casino. This may produce a traffic pattern for the person. The central server may also record what the person did at stop points along a journey in the casino.

When such tracking and data collection occurs for numerous people, the central system accumulates a lot of precise data that is useful for helping a casino provide tailored offerings to a patron. This also helps a casino service numerous patrons on a macro scale by providing the casino with detailed information on usage patterns, which is valuable when determining how to increase the layout efficiency of gaming machines and other entertainment resources in the casino. Thus, on a macro level, patron tracking may be used to improve or optimize entertainment resources in a casino via an empirical understanding of patron behavior relative to the layout of entertainment resources. As a result, gaming machines, card tables and other entertainment resources may be moved based on the accurate data collection.

Proximity tracking may also be implemented. In this case, a casino traffic controller may make real-time decisions of what tailored games and services are displayed or offered in a targeted location based on the identification or demographic status of one or more people in the targeted location. For example, gaming machines may display a game based upon information received from a server concerning the proximity of a high roller, or the demographic status of a patron who is within the proximity of a gaming machine or video screen. A small group of people may similarly be identified and serviced according to their common demographic status and proximity to known casino entertainment resources.

This methodology may also be used to promote other offerings and attract third party advertisers. For example, local shows and concerts in a city may advertise in real time within the casino to patrons of a selected demographic group—as they are identified in real time near video screens whose location is known to the central server. The casino may charge for this advertising service, which provides another revenue stream for the casino.

Figure 2:
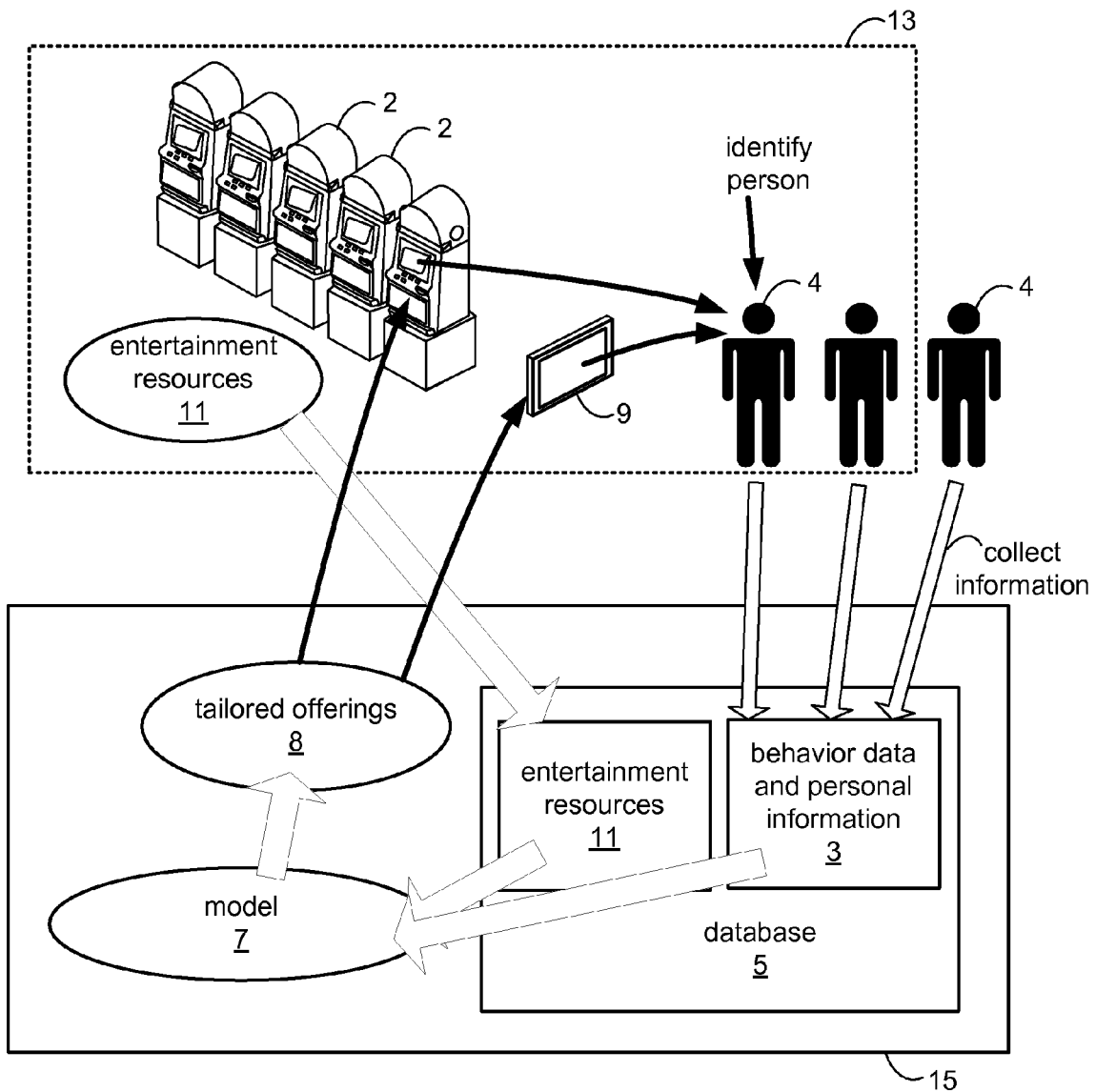
FIG. 2 pictorially shows an illustrative overview of this personalized offering methodology.

FIG. 1 shows a method 100 of providing tailored offerings in a gaming establishment in accordance with one embodiment of the present invention. FIG. 2 pictorially shows an illustrative overview of this tailored offering methodology. While the present invention will now be described as a method and method steps, those skilled in the art will recognize that the following description also may relate to systems, such as server based systems, of providing tailored offerings in a gaming establishment.

Method 100 builds a model 7 for selecting a tailored offering for a person (102). The model may be initially purchased by a casino as software, then adapted to the specific resources of the casino, and then further built over time as patron data accumulates. As will be described further below, the model uses data related to the behavior of multiple people in a gaming establishment and uses data for entertainment resources in the gaming establishment to dynamically select tailored offerings for a person. In one embodiment, the model is provided in software and implemented by a central server. The server may be in the casino or remotely provided, e.g., by a gaming services provider such as IGT of Reno, Nev.

As the term is used herein, a gaming establishment refers to any business or organization that operates at least one gaming machine on its premises and/or offers gaming machine services. Example establishments that currently operate gaming machines on their premises include: casinos, hotels, airports, restaurants, nightclubs, grocery stores, gas stations and convenience stores. A gaming machine services provider may include a gaming machine manufacturer or a business that offers gaming machine services (such as progressive pools or other gaming services, like paper ticket redemption). While the remaining discussion will be made in the context of a casino, it is understood that the present invention is not limited to use with a casino and may employed by any gaming establishment or business entity.

Figure 3A:
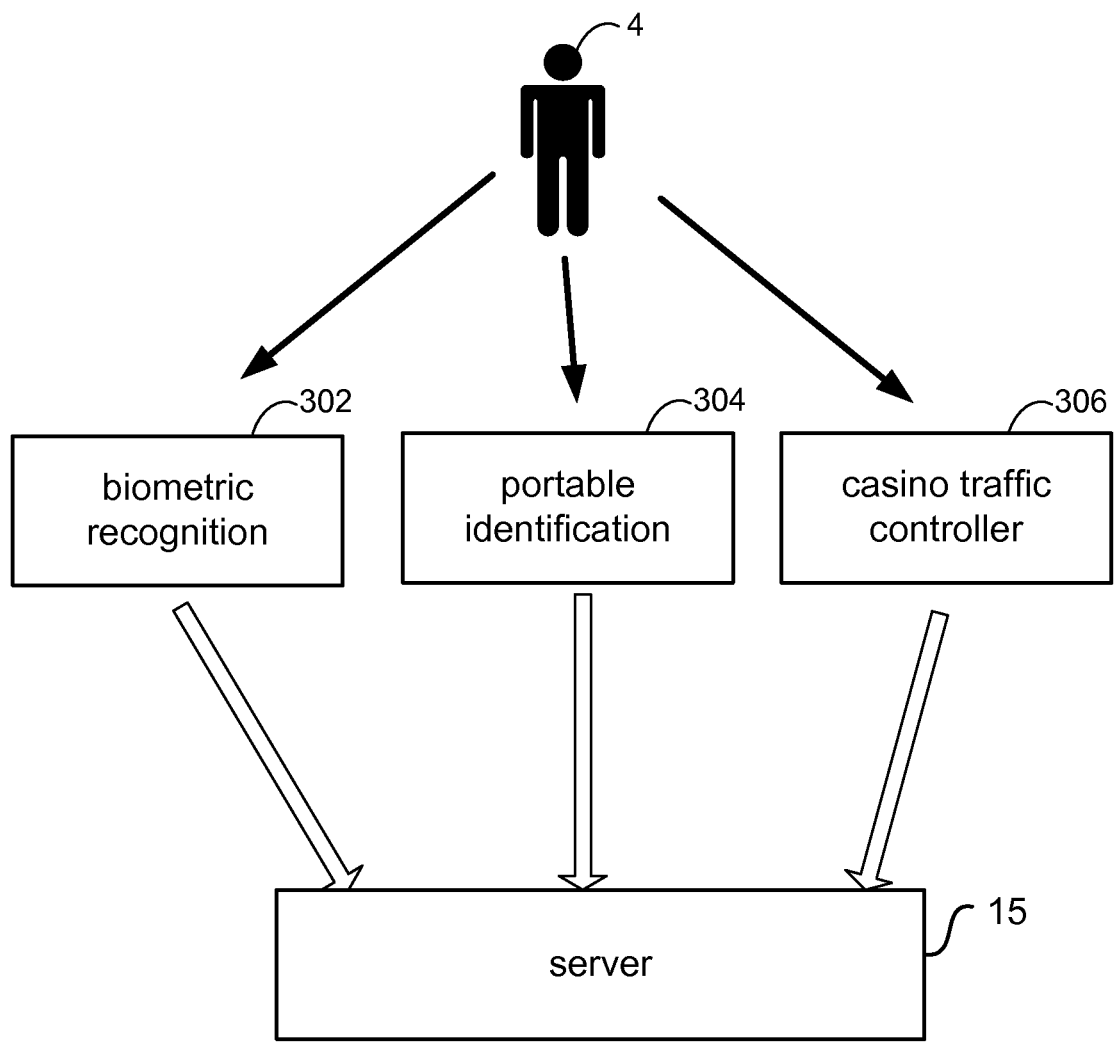
FIG. 3A shows various techniques for at least partially identifying and tracking a person in accordance with specific embodiments of the present invention.
Figure 3B:
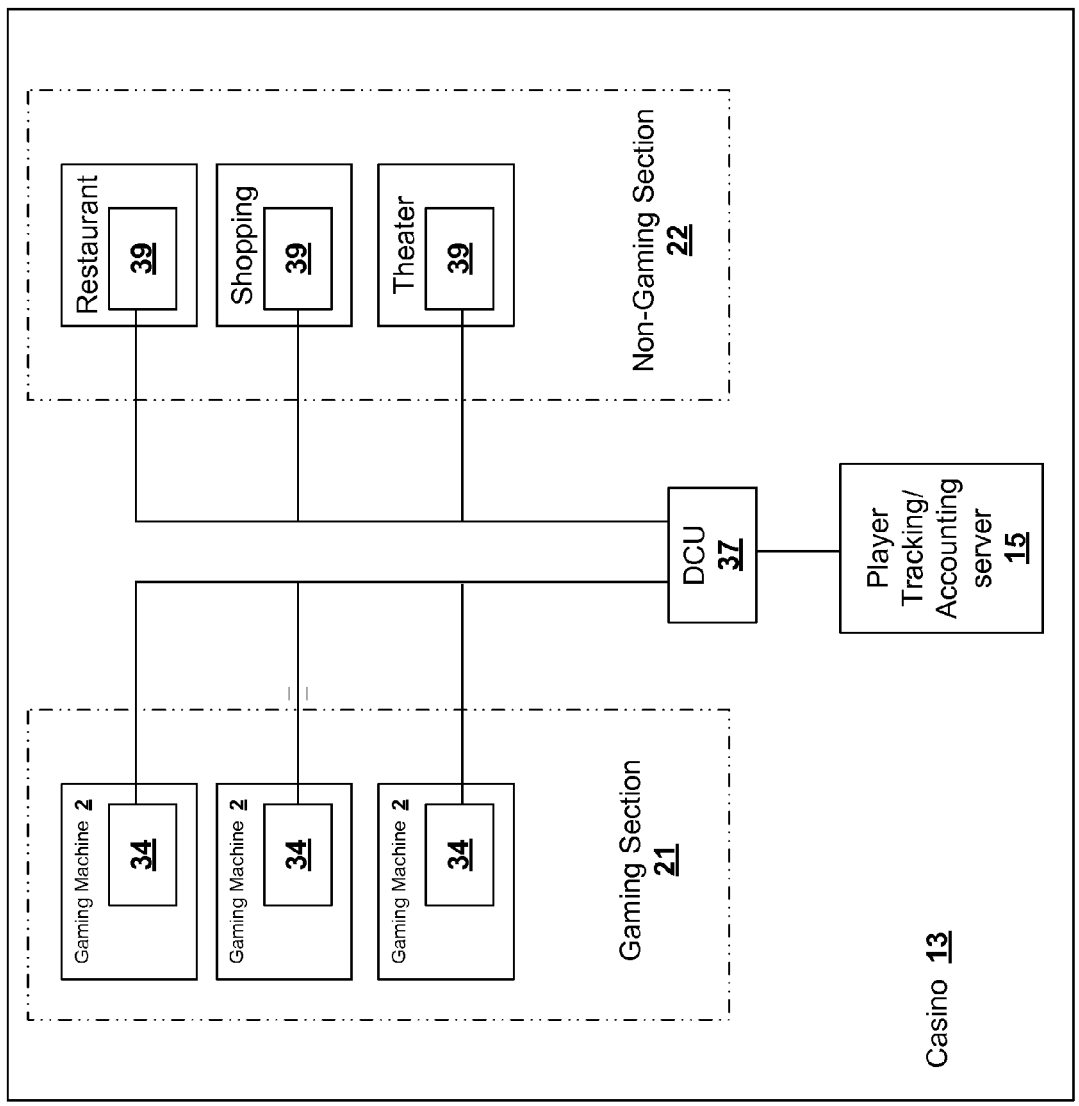
FIG. 3B shows a player tracking system for tracking customer activity in a casino establishment having gaming sections and non-gaming sections.
Figure 3C:
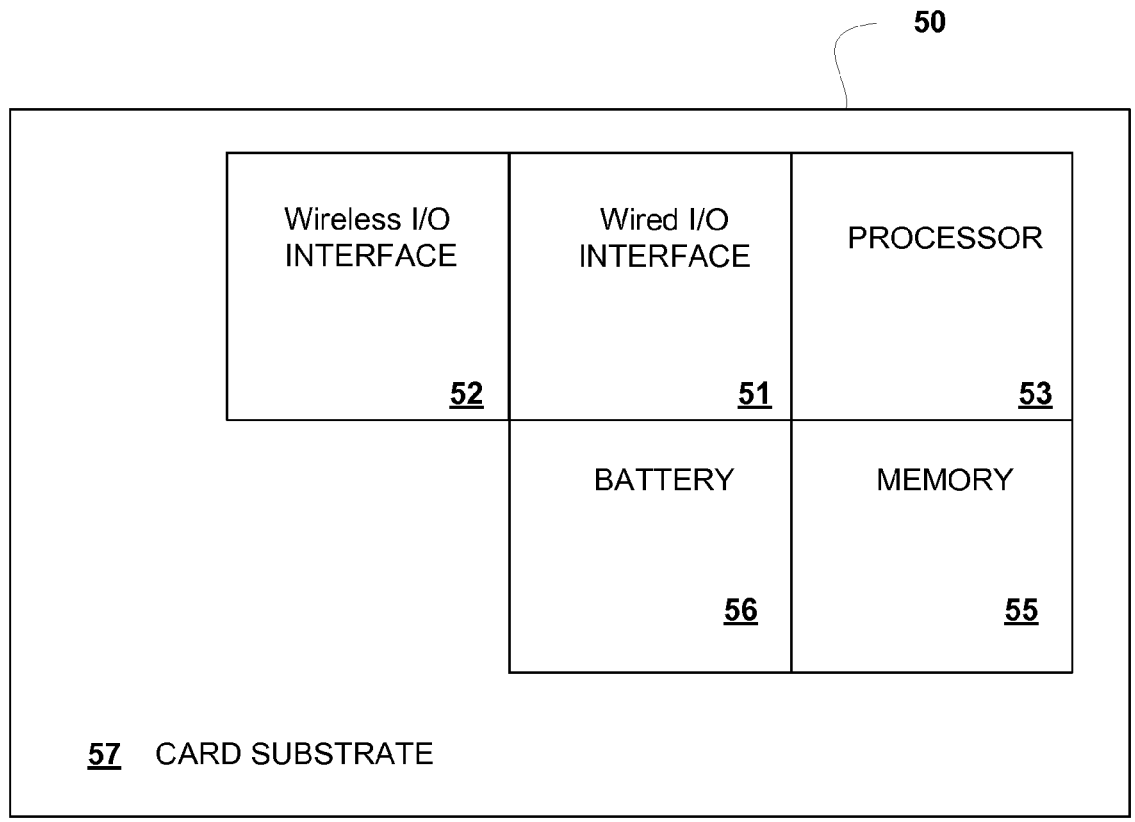
FIG. 3C illustrates a block diagram of the components of a smart card that may be used in the present invention.

Method 100 collects data related to the behavior of multiple people in a gaming establishment (104). The behavior data is useful in predicting what tailored offerings a person may like. FIGS. 3A-3C expand upon several techniques suitable for identifying and tracking a person and their behavior in a casino. A casino may use one or more data collection techniques. The behavior data generally refers to the actions and/or preferences of a person in the context of the entertainment resources of a gaming establishment. The behavior data may include data that describes where people move in the casino, how they spend their money, what games they play, what times they do so, for how long including when they enter and exit, patterns of betting, what casino service(s) that they use, commonalities between demographic groups, etc. In a specific embodiment described further below, the personal data may also allow a casino to estimate the value of a person as a customer.

The behavior data 3 may come from a variety of sources, such as prior game interaction, player tracking systems, demographic sources, marketing information, combinations thereof, etc. Other sources may be used. Tracking may occur repeatedly over time for new and existing patrons to further accumulates data for the model.

In one embodiment, behavior data includes historical game play data collected from gaming machines and other wagering entertainment resources such as card tables. Historical game play data may include any information associated with a previous game interaction, such as what games a person played in the past, when they played, and betting history. Gaming machines may store this information as a person plays; a camera on the gaming machine allows any player in front of the gaming machine to be identified using facial recognition techniques for example. A communications link between the gaming machine and a central server allows the historical game play data to be automatically and centrally stored and assigned to that person or that person's demographic group(s).

Player tracking systems represent a continuous source for behavior data such as prior game interaction and demographic information. The player tracking systems often gather personal information when the person signs up for player tracking, and collect historical game play data, over time, at gaming machines that the person plays. These systems allow a player to be identified at a machine, track games played by the player, and gather any information related to game interaction. Players agree to have their game play tracked by a central system in exchange for perceived added value in the form of rewards or other services offered by a casino. The player tracking systems also collect service preference data for a person.

Marketing information obtained by businesses associated with a casino represents another suitable source of personal information. Such marketing information is commonly provided with tour groups, trade shows (e.g., a Science Fiction or computer industry convention attending a Las Vegas hotel for a few days), and other temporary visitors to a city or casino. In addition, gaming information may be obtained by a personal questionnaire. The questionnaire may be acquired via paper, telephone, web-based, etc. A person when signing up for a room at a casino/hotel may fill out a paper questionnaire.

Additional suitable techniques to collect behavior data are described below with respect to FIGS. 3A-3C.

When stored, the behavior data may be logically divided or marked. In one embodiment, behavior data is assembled and stored according to demographic status, interests and/or personal preferences, such as favorite movies and actors, etc. For example, people in demographic groups that enjoy games related to television shows from a past era such as the 1960s (e.g., "I Love Lucy") are often different than people that favor science fiction games (e.g., "Star Wars"). Partitioned or marked demographic data for both demographic groups may then be used to suggest either game when a person of either demographic is recognized in a casino. For example, age may be used to indicate a proximity to the former game, while science fiction interest acquired in a personal survey may be used to predict enjoyment of the latter. In this manner, a person signing up at a hotel for a Science Fiction convention may be recommended games on gaming machines that people within that demographic group played in the past. The collected data of a particular demographic group may thus be used to suggest a tailored offering to a new person in that demographic group.

Method 100 then collects data for entertainment resources for the gaming establishment (106). The entertainment resources may include games, gaming devices, advertising devices, and services available to the gaming establishment. Example gaming devices found in a casino may include stationary gaming machines and portable or handheld gaming devices for example. Other entertainment resources may include: a blackjack, craps, poker or card table, a casino kiosk, a clerk validation terminal in a networked gaming system, a cash out station in a casino, a cash cage in a casino, a wireless walk around cash out station, advertising and information devices that allow a casino to communicate with a patron, or a cash out station associated with a server or system computer, for example. Advertising devices may include video screens and audio output in the casino. The video screens are useful to display advertisements and personalized messages to people as they walk near a video screen. Stored data for each of these entertainment resources may include identification and enumeration, its location, and what entertainment options the device offers.

In one embodiment, location tracking of a gaming device in a casino includes the use of wireless techniques. This may employ a transmitter on a gaming machine (or other entertainment resource) that transmits a location determination signal to server 15 (FIG. 2). In this case, the server 15 includes a receiver and is programmed to determine a location of the gaming device using the received signal. As the gaming machine is relocated within casino 13, its location is monitored. The server 15 may generate location data regarding the gaming machine in relation to other entertainment resources 11 of the casino. Tailored offerings may then be made based on the location information generated by wireless signal.

The game may include any game playable on a portable or stationary gaming device. Many possible games, including traditional casino games, video slot games, video poker, digitized mechanical slot games, video black jack, video keno, video pachinko, lottery games and other games of chance as well as bonus and progressive games are suitable for use herein. The gaming industry includes a number of game manufacturers that each provides a suite of games. For example, International Game Technology (IGT) of Reno, Nev. offers a wide variety of entertaining and thematic games (over 100 games) suitable for use with the present invention. In general, the present invention is not limited to a specific game played on a gaming machine 2. A tailored game offering may also include a bonus game or progressive game if the person has shown a preference for these games in the past.

Services in the gaming establishment may include any business or hospitality service. Some common casino and hotel services include: room services for a hotel, spa services, tickets to a local show or concert, food services such as restaurants, promotional game play, sports services, etc. Other services are suitable for use herein. The services also need not be run by the casino offering them, e.g., by an off-premises restaurant or concert.

Referring to FIG. 2, the personal data 3 and entertainment resources data 11 is stored using a database in memory 5, at a server that is either local to a gaming establishment 13 or at a remote gaming services provider 15, such as IGT. The server and its database 15 stores: behavior data for multiple people 3, casino entertainment resource data 11, the tailored offerings model 7, and/or the tailored offerings 8 for one or more people 4 identified in casino 13. The behavior data for multiple people 3 and casino entertainment resource data 11 are updated, as desired, as the server receives new data.

Method 100 of FIG. 1 then at least partially identifies the person in the gaming establishment (108). For example, as shown in FIG. 2, when a person 4 walks into casino 13 or nears a gaming machine 2, machine 2 partially or fully recognizes the person.

Partial identification refers to identifying one or more characteristics of a person that the person shares with others. Partial identification may be based on demographics such as sex (M/F), age, country of origin, education level, annual income, occupation, and marital status, for example. Partial identification may also include other personal information such as attendance at a convention (e.g., a computer or other industry convention associated with a hotel where all attendees are staying) favorite sports team (e.g., a person wears a football jersey when walking through a casino), and a favorite game (e.g., the person walk into the casino and played one game for an hour), for example. Any of this information may be used to determine tailored offerings. Again, previous offerings to people of a similar demographic group (or people with similar interests) may be used to determine what to offer a person when only the person's demographic group is known.

Full identification refers to uniquely identifying the person apart from all other people. Several techniques for partially and fully recognizing a person at a gaming machine are described below. For example, biometric identification is a proven technique to uniquely recognize a person. Facial recognition, using a camera at an entrance of a casino, is well suited for both partial and full recognition.

Full identification may include access to information in a player tracking account or other detailed information that facilitates tailored offerings. For example, the player tracking account may include information related to hobbies and interests, preferred vacation destinations, education level, annual income, occupation, marital status, number of children, favorite game, etc. Full identification may also be done anonymously. For example, a person may be identified anonymously using a room card or using biometric information linked to a player tracking account that does not name the person.

The model then uses the data related to the behavior of multiple people in a gaming establishment and uses the data for entertainment offerings in the gaming establishment to select tailored offerings for a person (110). The tailored offerings 8 refer to entertainment resources that a person is likely to enjoy or value. Different people enjoy different games, and techniques described herein tailor game offerings and other entertainment resources towards individuals based a) on their behavioral data, and b) data mining criteria established to convert behavior data into tailored offerings 8 for a set of entertainment resources in a casino.

This selection process reduces the total number of entertainment resources carried by a gaming establishment to a lesser number that is more likely to interest a person. This avoids a patron wasting time on games and services that they are indifferent about, increases participation on games and services that they are likely to enjoy, and provides better service from the casino.

The model may include data mining systems 7 and methods that filter the behavior data 3 and the entertainment resources 11 and select tailored offerings 8 for a person. In one embodiment, a weighted algorithm is used to automatically determine the tailored offerings based on the identification, behavior data and the entertainment resources 11. The weighted algorithm assigns a weight to each variable for behavior data in the system, according to the identification. For example, weights may vary from 0 to 1, and a weight of 1 applied to a Science Fiction category when the person's behavioral data suggests a strong interest in Science Fiction. Dozens or hundreds of weights and variables may be included in the model. Further description of a model suitable for use herein is described in commonly owned and co-pending patent application Ser. No. 11/459,245 and entitled "CUSTOMIZABLE AND PERSONAL GAME OFFERINGS FOR USE WITH A GAMING MACHINE", which is incorporated by reference in its entirety for all purposes.

In one embodiment, an automated and computer-implemented data mining analysis 7 selects tailored offerings 8 using a) personal information and b) selection criteria for the personal information. The automated filter outputs tailored offerings 8 for each person, given only a list of available entertainment resources 11 at casino 13, personal information (such as Science Fiction preference), and a selection criterion. The automated filter thus provides techniques and algorithms that mine personal and behavior data for hundreds or even thousands of people 4 and provides high throughput production of individualized results and tailored offerings 8 for each person.

Referring back to FIG. 1, method 100 then provides the tailored offering to the person in the gaming establishment (112). In FIG. 2, a teaser for a recommended game may be downloaded to a gaming machine 2 and displayed for a player 4 as they pass a gaming machine 2. Alternatively, a video advertisement for a tailored restaurant offering may be sent to video screen 9 when the person nears a video screen. For example, if the person went to a restaurant in casino 13 for breakfast, then an advertisement for the restaurant may be output to the person as they pass: a) a video screen 9 near their room each time they are recognized by a camera in the hall as they leave in the morning, b) a video screen 9 near a gaming machine they play, and/or c) a video screen 9 near an entrance when they re-enter the casino, etc.

In a specific embodiment, data collection, tailored offering selection, personal identification, and individualized offerings are all automated. This requires little personnel management by the gaming establishment for each person 4. Casinos may then implement tailored offerings with minimal overhead for a large number of patrons using automated processes.

In another specific embodiment, tailored offering selection is done with the assistance of a casino traffic controller—a person who monitors activity in the casino and helps select and provide tailored offerings. The casino traffic controller continuously monitors activity in a casino, and makes tailored offerings to people walking through in real time.

FIG. 3A shows various techniques for at least partially identifying a person that are suitable for use with specific embodiments of the present invention.

In one embodiment, patron identification employs biometric recognition 302. Biometrics uses biological information to establish and verify identity of a person; the basic idea behind biometrics is that each person's body contains unique properties that can be used to distinguish the person from others. 'Biometric data' refers to data used to identify a person based on a person's physical trait or behavioral characteristics. 'Biometric identification' refers to the process of identifying of a person based on his or her biometric data. Fingerprint identification is one example of biometric identification, and may be implemented with an optical scanner and fingerprint software installed on a gaming machine. Facial recognition, retina scans, hand-written signatures, voice patterns and/or palm prints are also suitable for use herein. Facial recognition may use a camera on a gaming machine 2, or any other camera in a casino, and allows identification without the user or casino operator performing any initiating action. Facial recognition is also well suited for both full identification (e.g., uniquely identifying a person) or partial identification (e.g., identifying a person as part of an age demographic group). Other forms of biometric authentication 302 are suitable for use herein.

Biometric patron tracking 302 may be employed by patron tracking as described herein in unique ways. In a specific embodiment, it is used to authenticate a user of a mobile gaming device. This acts as a policing mechanism to prevent unauthorized gaming on the mobile device. A gaming machine may also have a "Play" button programmed to read thumb or finger prints, which provides for unobtrusive patron tracking. Patron tracking via facial recognition may also be implemented using security cameras in a casino or cameras embedded in gaming machines. This provides an unobtrusive way to identify high rollers and potential security risks, for example. Biometric patron tracking could also be used to track patrons that do not like to register for patron tracking cards.

In another embodiment, a person carries personal identification. For example, a casino patron may carry a portable gaming instrument 304, which refers to any portable device used in a casino that is able to identify a person. This may include a paper ticket or voucher, a smart card or debit card. For example, portable instrument 304 can be a player-tracking card or paper ticket that partially or fully identifies the person carrying the instrument 304. In this case, a gaming machine 2 is equipped with a reader that allows players to insert their portable device into gaming machine 2 to be read before or during game play. Exemplary printed credit devices include printed-paper tickets and printed plastic cards. Plastic cards including a magnetic strip that stores information are also suitable for use herein. Some casinos issue player identification or player tracking cards that furnish a person awards for frequent patronage. Before beginning play, a player presents the card to a magnetic card reader that communicates with the gaming machine. The reader detects the card, and software on the gaming machine or network notes the card value and person. A person may carry the portable gaming instrument until redemption at a gaming machine, cash-out station or another location in a gaming establishment that redeems portable credit devices.

In one embodiment, portable instrument 304 uses wireless technology to communicate with server 15 or some intermediary device such as a wireless reader on a gaming machine or other gaming device. In one embodiment, portable instrument 304 uses RFID technology. RFID systems suitable for use with the present invention are described in further detail below with respect to FIGS. 5A and 5B.

The portable gaming instrument 304 may fully or partially identify the person carrying the instrument 304. For example, a paper ticket may be given to each member of a Science Fiction convention; in this case, the personal information on the ticket only includes Science Fiction information for the person (and maybe other information such as a hotel for the convention). Conversely, a player tracking card often fully identifies the person.

A casino traffic controller 306 may also at least partially identify the person. One or more cameras in the casino may be positioned to monitor locations in the casino. The casino traffic controller 306 watches one or more of these locations on a video screen and makes real-time decisions for offerings based on what the video screen displays. Thus, the video screen may display a group of young men walking through the casino. In response, the casino traffic controller 306 may offer advertisements on nearby video screens 9 according to their demographic status. Alternatively, the casino traffic controller 306 may recognize a high roller and offer advertisements on nearby video screens 9 according to a high-income demographic status.

Figure 6:
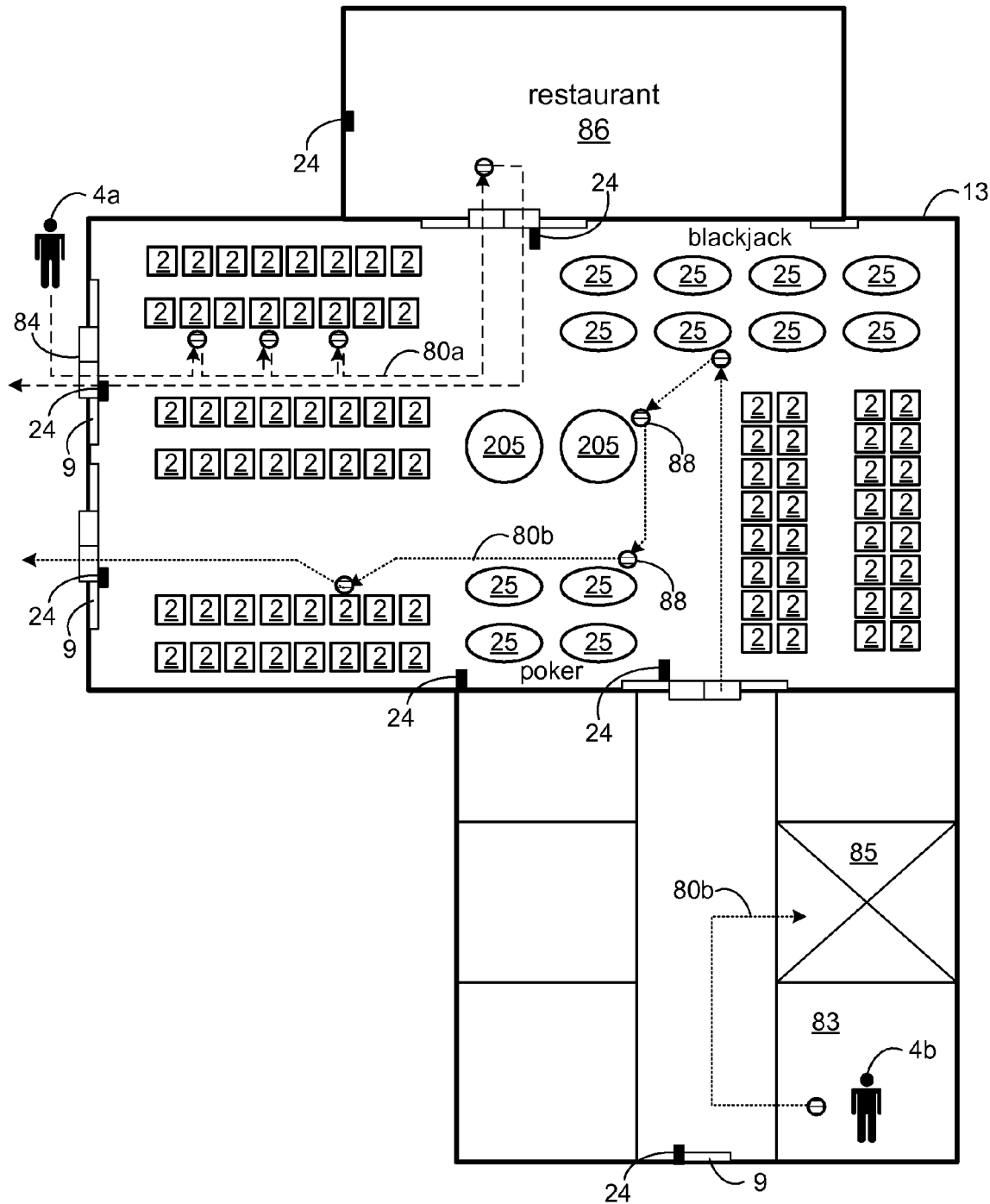
FIG. 6 shows sample traffic patterns for two people in a casino in accordance with a specific embodiment of the present invention.

In one embodiment, the present invention provides a tracking system for tracking patrons and patron activity in a gaming establishment having gaming sections and non-gaming sections. In one embodiment, the robust tracking system uses player tracking cards or other portable gaming devices adapted for distribution to patrons. These cards include respective customer IDs that are associated with respective customer accounts. The system also includes a plurality of gaming activity player tracking units positioned in a gaming section of a casino proximate the gaming activity. These activity player tracking units cooperate with the player tracking cards to monitor gaming activity data of a respective customer. Non-gaming activity player tracking units are also positioned about the casino in its non-gaming sections, and cooperate with the player tracking cards to monitor the non-gaming activity data of the respective customer. A computer system or central server includes a database of the respective customer accounts associated with respective customer Ids. Each gaming activity player tracking unit and each non-gaming activity player tracking unit is coupled to the computer system to process the respective gaming activity data and non-gaming activity data for each respective customer. In this case, not only is the gaming activity monitored, but non-gaming activity is also monitored. In addition, patron movement throughout the casino establishment is monitored which provides the establishment with a unique ability (FIG. 6).

In a specific embodiment, the non-gaming activity player tracking unit includes a wireless interface configured to detect the presence of a respective player tracking card in the local vicinity of the respective non-gaming section of the casino establishment. This device is configured for placement proximate the entrances and exits of selected, respective non-gaming sections of the casino establishment. Thus, the non-gaming activity player tracking unit can detect when a respective customer enters and/or exits a particular respective non-gaming section, such as a casino restaurant, a casino shop, a casino theater, a casino bar or a casino showroom.

FIG. 3B shows a player tracking system, generally designated 20, for tracking customer activity in a casino establishment having gaming sections 21 and non-gaming sections 22 in accordance with a specific embodiment of the present invention. The tracking system 20 includes a plurality of player tracking identification devices 304 adapted for distribution to casino patrons. These devices 304 include respective customer IDs which are associated with respective customer accounts. The system 20 further includes a plurality of gaming activity player tracking units 34 positioned in a gaming section 21 of the casino establishment 13. These activity player tracking units 34 cooperate with the player tracking identification devices 304 to monitor the gaming activity data of a customer. A plurality of non-gaming activity player tracking units 39 are also positioned about the casino establishment 26 in a non-gaming section 22 which cooperate with the player tracking identification devices 304 to monitor the non-gaming activity data of the customer. A central computer system 15, or server, of the player tracking system 20 includes a database of the respective customer accounts associated with respective customer Ids. Each gaming activity player tracking unit 34 and each non-gaming activity player tracking unit 39 is coupled to the computer system 15 to process the respective gaming activity data and non-gaming activity data for each respective customer.

Tracking system 20 enables a casino to monitor both gaming activity and non-gaming activity. For example, the non-gaming activity player tracking units 39 can be adapted to monitor the entrance and/or the exit of the patron in a non-gaming section 22 of the casino. One form of non-gaming activity monitoring would be the tracking of patron movement throughout the establishment in non-gaming avenues of a casino such as theater, shopping and restaurants. By recording the time of entrance and exit of a patron in a particular store or restaurant, the casino can monitor and analyze their tendency to shop particular stores or frequent particular restaurants. Using the combined gaming activity data and non-gaming activity data, promotions and customer service programs can be more customized toward a respective customer, which enables a casino to better tailor advertisements and promotional awards to the customer based upon their past behaviors in the casino at both gaming and non-gaming activities.

By way of example, if the non-gaming activity data revealed that a particular patron frequently visited one of the many casino restaurants or shops more than another, future promotions may advertise that restaurant for that patron to entice future patronage. Moreover, other promotions from other casino restaurants or stores can be directed toward that respective customer to entice patronage at those the customer does not frequent.

In addition, data collected for each person in non-gaming activities may also be assigned to one or more demographic groups to help service other future people in each demographic group. This accumulates data for a demographic group or study. Casino personnel, for instance, may better estimate how long it takes for a patron of a particular demographic group to begin gambling after they have entered the property, and how much they are likely to wager. In other situations, the establishment could identify which restaurants, shops, etc. that a patron more frequently visits even if they use cash for purchases. This may add another level to focusing casino operations and marketing on maximizing patron behaviors.

In still other applications, the player tracking system 20 may identify a patron through their player tracking identification device 304 as they entered a restaurant or shop. A host or sales consultant may then approach and greet that patron by name, offer comps or promotions to VIP's, know what products interest them, etc.

FIG. 3B shows a block diagram that illustrates the data collection side of the player tracking system 20 having a central player tracking/accounting server 15. The player tracking account server 15 is typically configured to a) store player tracking account information relating to a player's previous game play, b) store player tracking account information relating to a player's historical frequency (e.g., the date and time spent) in the selected non-gaming sections of the casino. In some embodiments, server 15 also: c) calculates player tracking points based on a player's game play that may be used as basis for providing rewards to the player; and d), calculates player tracking points and promotions based on a player's frequency at the selected non-gaming sections. The system 20 also includes a plurality of gaming activity player tracking units 34 to monitor the gaming activity data received from their corresponding gaming activity interfaces. This gaming activity component may be provided by conventional player tracking technology. Further coupled to the player tracking server 15 is a plurality of non-gaming activity player tracking units 39 that monitor the non-gaming activity data received from corresponding non-gaming activity interface positioned at the corresponding sections.

Player tracking may include a conventional gaming activity component of a player tracking system, such as any of those currently in widespread application. Briefly, as illustrated in FIG. 3B, the block diagram of a number of gaming machines 2 with gaming activity player tracking units 34 is illustrated connected to servers providing player tracking services. For example, in casino 13, gaming machines 2 are connected, via a data collection unit (DCU) 37 to the computer system or player tracking/accounting server 15. The DCU 37, which may be connected to up to thirty-two (32) gaming activity player tracking units as part of a local network in a particular example, consolidates the information gathered from player tracking units in gaming machines 2 and forwards the information to the player tracking account server 15.

Each gaming machine 2 may include a player tracking unit 34 or slot machine interface board (SMIB). In some instances, the player tracking unit 34 and SMIB are manufactured as separate units before installation into a gaming machine 2. Some player tracking units 34 include three player tracking devices: a gaming activity card reader; a key pad; and a display, all mounted within the player tracking unit. These player tracking devices are used to input player tracking information that is needed to implement the player tracking program. The player tracking unit 34 may include a wireless Input/Output Interface as well. The gaming activity component of player tracking system 20 may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may be mounted flush or at a slight angle upward with a horizontal in a flat top gaming machine.

The gaming activity player tracking unit 34 communicates with the player tracking server via the SMIB, a main communication board for the gaming machine and the DCU 37. The SMIB allows the player tracking unit 34 to gather information from the gaming machine 2 such as an amount a player has wagered during a game play session.

In one specific embodiment, by way of example, when a game player desires to play a game on a gaming machine and use the gaming activity component of player tracking system 20 available through the player tracking unit, a game player inserts their issued player tracking identification device 304, such as a magnetic striped card, into a card reader on the gaming machine. One common approach for providing identification information is to issue a magnetic-striped card storing the necessary identification information for each player. The issued player tracking identification device 304 may alternatively include wireless interfaces such as Radio Frequency (RF) enabled smart cards and/or wireless Personal Digital Assistants (PDA) which enable wireless communication with the player tracking server. Accordingly, wireless communication may be provided for both the gaming activity player tracking unit 34 and the non-gaming player tracking unit 39.

After the magnetic striped or smart card has been so inserted, the gaming activity player tracking unit 34 detects this event and receives certain identification information contained on the card. For example, a player's name, address, social security number and player tracking account number encoded on the magnetic striped card, may be received by the player tracking unit 34.

Details of player tracking units with peripheral devices operated by a master gaming controller are described in co-pending U.S. patent application Ser. No. 09/838,033, filed Apr. 19, 2001, by Criss-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes. Moreover, details of player tracking systems with wireless player tracking identification devices are described in co-pending U.S. patent application Ser. No. 09/921,489, filed Aug. 3, 2001, by Hedrick, et al, titled "Player Tracking Communication Mechanisms in a Gaming Machine" which is incorporated herein in its entirety and for all purposes In one embodiment, the non-gaming player tracking unit 39 (FIG. 3B) uses wireless communication to monitor patron movement throughout the non-gaming sections 22 of a casino without inconveniencing the patron. Thus, the non-gaming activity player tracking unit 39 of the tracking system includes a wireless interface configured to locally communicate with the respective wireless identification device 304 issued to that customer. In this manner, movement of the patron can be detected and tracked in the selected non-gaming sections of the casino establishment without requiring a manual input device in that section. By placing the wireless interfaces at or in the vicinity of the entrances and exits of the selected non-gaming section, the entry into and exit, as well as the time of entry and exit from that non-gaming section can be detected and monitored.

The wireless interface may be applied to detect or communicate with the identification device 304 carried by the player. These wireless identification devices 304 may be provided by a Radio Frequency (RF) enabled smart card, which has a footprint about the size of a player tracking card, a portable game token carried by the person (see FIG. 5B) or a portable wireless device, such as a Personal Digital Assistant (PDA) carried by the player. Accordingly, when a patron is in a non-gaming section 22 of the casino, the respective wireless interface may automatically detect the player tracking identification device 304 carried by the player (or they may automatically detect each other) to establish communications allowing presence detection and/or allowing gaming information to be transferred between the wireless devices.

By way of example, the wireless interface may use a wireless communication standard such as Bluetooth™ to communicate with portable wireless devices using the same standard. It will be appreciated, however, that other wireless communication protocols such as IEEE 802.11a, IEEE 802.11b, IEEE 802.11x (e.g. other IEE802.11 standards), hiperlan/2, and HomeRF may also be used. Bluetooth devices communicate on a frequency of 2.45 Gigahertz. Typically, Bluetooth devices send out signals in the range of 1 milliwatt; the signal strength often limits the range of the devices to about 10 meters but also limits potential interference sources. Interference is also limited by using spread-spectrum frequency hopping. For instance, a device may use seventy-nine (79) or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation commences to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, the members of the piconet randomly hop frequencies so they remain in touch with another and avoid other piconets that may be operating in proximity to the established piconet. When Bluetooth is applied in a casino environment, many such piconets may be operating simultaneously.

The wireless interfaces, therefore, should only be capable of local detection of the player tracking identification devices 304 so that the wireless player tracking units at adjacent non-gaming sections, or even the same section, will not improperly detect the presence of the patron. Such localized detection should be within the range of about 0.0 feet to about 10.0 feet, or in the range of about 3.0 feet, of the entrances into selected restaurants, shops, bars, nightclubs, theaters or any other strategic locations throughout the casino establishment 13.

There are several conventional types of wireless technologies which may be applied for wireless identification devices. For example, these include the Radio Frequency Identification (RFID) Systems such as the Ti-FRID systems provided by Texas Instruments Incorporated of Dallas, Tex., and the contactless smart cards by Fargo Electronics, Inc. of Eden Prairie, Minn.

One suitable technology is a Radio Frequency (RF) enabled smart card which can be applied in both the gaming activity tracking unit 34, and the non-gaming tracking unit 39. For instance, FIG. 3C illustrates a block diagram of the components of a smart card 50 that may be used in the present invention. The RF enabled smart card may be designed for wired or wireless use with a gaming machine, gaming peripheral, gaming terminal or some other gaming device, or use with the wireless interface of the tracking unit 39 situated in the non-gaming section 22 of the casino. The smart card 50 may have the same footprint as a magnetic striped card and may include a wired input/output interface 51, a wireless input/output interface 52, a processor 53, memory 55 and a battery 56 incorporated in some manner on a card substrate 57.

The battery 56 is used to supply power to operate the devices on the smart card 50. In some embodiments, when it is inserted into a smart card reader of some type, power may also be supplied to the card by the smart card reader. The processor 53 may be a general purpose microprocessor or a custom microcontroller incorporating gaming specific firmware. The memory 55 may be flash memory. The wired Input/output interface 51 may be an I/O EEPROM or the like that allows the smart card 50 to communicate with a smart card reader. Further, the I/O interface 51 may include one or more communication protocols that allow the smart card 50 to communicate directly with a gaming machine, gaming peripheral, gaming terminal or some other gaming device designed to communicate with the smart card. Some communication protocols may be stored in the memory 55 of the smart card 50. The communication protocols stored in the memory 55 may be added or deleted from the smart card 50 as needed.

In accordance with the present invention, the wireless smart card readers of non-gaming activity player tracking units 39 may be provided by strategic positioning around the casino to track and monitor movement of patrons. In particular, for casino non-gaming sections 22 such as restaurants, shops, theaters, bars or showrooms, the wireless smart card readers are positioned proximate the entrances and/or exits into and out of the respective sections. Similar to department store security devices, these localized radio receivers may include two cooperating detector devices adapted for placement on opposed sides of each entrance/exit. When a patron carrying an RF enabled smart cards passes between the opposed detectors, their entrance/exit from the non-gaming section can be automatically detected and recorded.

The functions of the smart card, described above, may be performed by other wireless gaming devices. For instance, a player may carry a personal digital assistant (PDA) that executes gaming applications, and may communicate with the non-gaming activity player tracking unit 39 or gaming activity player tracking unit at the gaming machine via a wireless communication interface. One example of a PDA that may be adapted for use with the present invention is the Palm VII from Palm, Inc., Santa Clara, Calif. Other suitable wireless RFID devices are described in further detail with respect to FIGS. 5A-5C.

Figure 4:
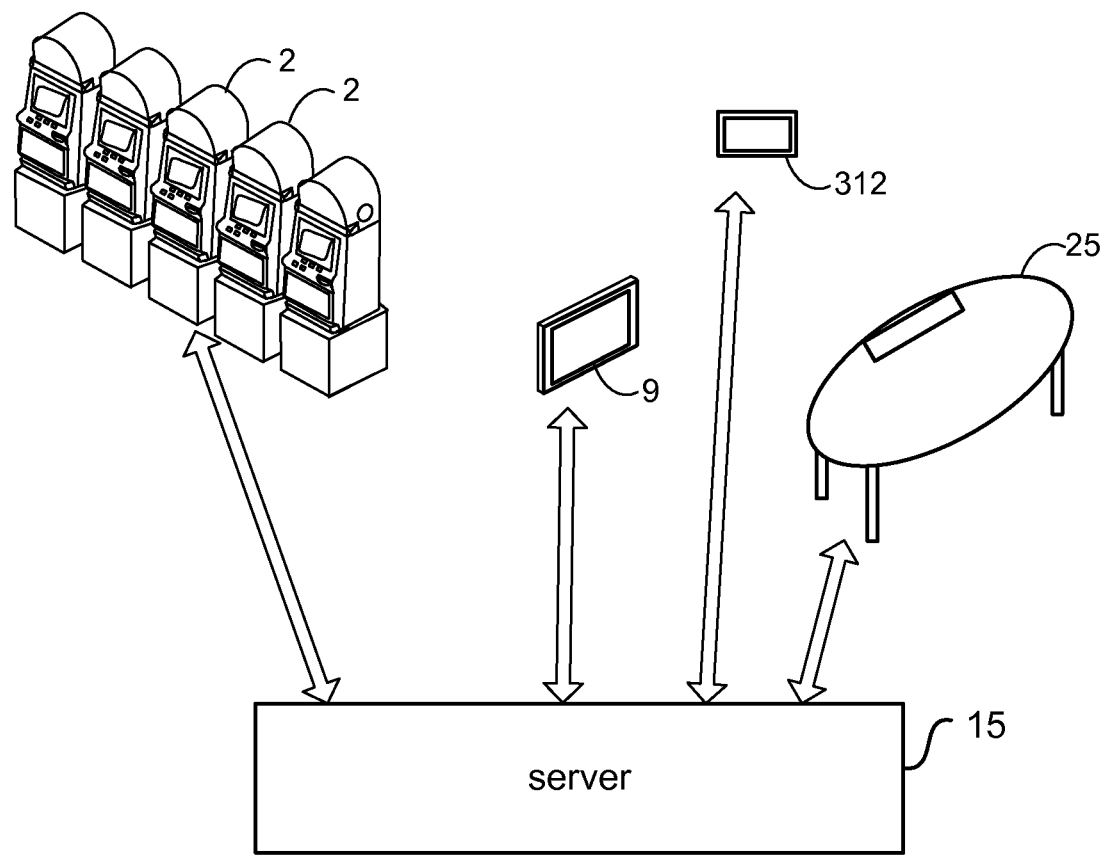
FIG. 4 shows collection of entertainment resource data in a casino in accordance with one embodiment of the present invention.

The present invention also tracks entertainment resources in a casino. FIG. 4 shows collection of entertainment resource data in a casino in accordance with one embodiment of the present invention.

Entertainment resources tracked in this manner may include: gaming devices such as gaming machines, tables such as poker tables, craps tables and blackjack tables, video screens, cameras, dynamic displays showing advertising and push promotional offerings, group gaming offerings, etc Data tracked for each entertainment resource may include details of what it is (e.g., blackjack card table, gaming machine, game name currently on the gaming machine, etc.), current location, date moved to its current location, data associated with the gaming activity at present location and historical data from previous locations, games offered on current machine historically and at present location, number of times a new game was downloaded to gaming machine at present location and historical locations, etc. Data tracked for each gaming machine may also include model, hardware options, and game option, for example.

Communication between server 15 and gaming machines 2, video screens 9 and mobile gaming devices 312 may use any suitable communications technology and protocol. LANs and WANs are well suited for gaming machines, for example.

In a specific embodiment, gaming machines 2 and video screens 9 use a wireless technology when communicating with server 15. Wireless entertainment resource tracking may be implemented in both traditional gaming machines 2 and mobile gaming devices 312. The location of these devices can be tracked and the information stored in a central database associated with server 15. Several wireless technologies are suitable for use herein. 802.11 is one suitable wireless protocol and technology that offers commercially available equipment. GPS technology may also be used to track mobile gaming devices beyond the limits of a casino property. This allows a casino to track devices 312 and/or patrons 4 to determine where they are going while not utilizing the offerings in a particular casino. This may also be stored as behavior data 3.

The present invention is well suited to collect data from people (FIG. 3A) entertainment resources (FIG. 4) using RFID technology. FIG. 5A shows a poker table 25 that includes RFID readers in accordance with one embodiment of the present invention. Poker table 25 includes a playing surface 23, a set of RFID readers 24, and a dealer station 27. Poker table 25 includes twelve seats 29, lettered A-L, disposed around the perimeter of table 25. Each seat 29 is intended to sit a person that wants to play poker at table 25. Table 25 may include a different numbers of seats, such as six, eight or ten.

In one embodiment, each person carries an RFID device, associated with their identity, that a reader 24 can detect. For example, a player-tracking card 304 associated with a person may include an RFID tag. Alternatively, portable gaming tokens 35 carried by the players may have RFID tags included therein and each associated with a patron 4. Externally, the tokens resemble coins, but include RFID tag technology internal to the outer body. In this case, a central server assigns token ownership to a person by: a) appointing a unique ID number to each token 35, and b) allocating identification information that correlates the identification number and a current owner. Token tracking software may then monitor ownership of each token on the table, and which tokens 5 each person sitting at a seat owns using the ID number for each token. The tokens also provide a means to track a person through a casino property using any RFID readers in the property.

Table 25 includes multiple RFID readers 24. Each RFID reader 24 is embedded below surface 23 (hence the dotted lines in FIG. 5A) and monitors the presence of RFID devices carried by people 4 within a local area determined by its interrogation range. For example, a centrally disposed RFID reader 24 for the table, designated $R_{table}$, detects and monitors the presence of RFID devices carried by people 4 in the vicinity of the table. Each seat 29 may also includes its own RFID reader 24, designated $R_{A-L}$, that detects and monitors the presence of an RFID device carried by people 4 for each seat A-L, respectively. Other RFID reader configurations are suitable for use herein.

FIGS. 5B and 5C illustrate an RFID token 35 in accordance with one embodiment of the present invention. FIG. 5B shows a side view of token 35, while FIG. 5C shows a top cross section of token 35 taken through plane A-A of FIG. 5B.

Token 35 includes a body 65, an identification (ID) tag 66, a memory component 68, and one or more communications components. In this instance, the communications components include rectifier 62, a modulator 64, and an antenna 69.

Body 65 includes a rigid material, such as a durable and substantially rigid plastic, that is externally shaped to resemble a coin. The internal RFID components are embedded within a central portion 65*a* of body 65.

Functionally, a wireless probe of token 35 identifies the portable RFID device relative to other portable RFID devices near it. This may occur using any suitable identification technique, such as a unique frequency response from the token or logical enumeration and identification, for example. In a specific embodiment, when probed, token 35 replies with a unique identifier, ID number, or other numeric representation assigned to token 35. The identifier distinctively enumerates each token 35. This allows each token 35 to be distinguished from other tokens 35—as would be encountered when numerous tokens 35 are in a reading range of reader 24 on poker table 25. The unique identifier also provides a means of automatically logging and updating data entry corresponding to the status of each token 25, such as when ownership changes between players at a poker table or when the token is inserted into a gaming machine. In one embodiment, portable RFID device 35 automatically returns an identification signal when probed by token reader 24.

Portable RFID device 35 includes a wireless communication system. For the embodiment shown in FIG. 5C, antenna 69 and modulator 64 serve as a wireless transponder. A transponder functions to receive and transmit wireless signals. The transponder on token 35 receives a wireless signal from token reader 24, and in some embodiments, that signal includes sufficient power to allow transmission of the token's identifier and authentication information back to reader 24. In a specific embodiment, the transponder includes an amplifier for increasing the strength of a received incident signal (from the reader 24 or other actuating device), a modulator 64 for modifying that signal with information provided to the transponder, and an antenna 69 or antennas for receiving and transmitting a wireless signal. Modulator 64 is that part of a transponder that impresses information on a transmitted signal. In some embodiments, the interrogation and energizing signals are separate entities. In other embodiments, they are provided by the same means for simplification purposes, or may include an amplifier to facilitate signal transmission. Other transponder designs are appropriate for use with authenticating tokens 5 of the present invention.

In one embodiment, reader 24 provides power to token 35. The power may be transmitted by RF waves, for example. Rectifier 62 rectifies the incoming signal, thereby providing sufficient DC voltage to operate any digital circuitry in token 35.

The transponder is operationally coupled to identification 66 in a manner giving it access to the identification 66 during probing by token reader 24. Various types of identifier tags 66 may be used with token 35. Examples of suitable ID tags 66 include microchips storing an ID code (e.g., an EPROM), magnetic recording devices, and the like.

Memory 68 stores information for token 35, such as an identification for who currently carries the token. Memory 68 may also include other information, not limited to: information relevant to a gaming property (e.g., casino name or identifying number); use of the token (such as its ownership history); or any other information pertinent to gaming interaction or token 35 usage. Memory 68 may include a digital (e.g., an EPROM) or other form of memory. In another embodiment, token 35 does not include a separate identification 66 and memory 68, and the two are combined into a single memory 68 or identification 66.

Wireless ID tags are commercially known and there exists numerous manufacturers that currently offer a suitable selection of RFID tags. These tags may be either passive (receive energy via a rectified incident signal) or active (include their own power source). Major manufacturers include Texas Instruments of Dallas, Tex., Micron Communications of Boise, Id., Motorola of San Jose, Calif., and Gemplus International S.A. of Montgomeryville, Pa. Each manufacturer provides several models suitable for use herein.

Portable RFID devices 35 and reader 24 use wireless communication that takes place via electromagnetic radiation of one or more appropriate frequencies. Generally, however, token reader 24 and token 35 may be designed to allow any suitable probe signal or carrier (not just RF or other electromagnetic radiation). The carrier should allow token 35 to be probed from a substantial distance and over a wide area. It may also power the transmission of data from token 35 to reader 24. The carrier should also provide sufficient bandwidth to transfer the desired information in a timely manner. Additionally, the modulated carrier may also be sufficiently unique, in terms of frequency or time synchronization, or coding, such that it is distinguishable from the signal provided by nearby tokens 35. Generally, the carrier may be a wave or field or other intangible effector that acts over a distance through one or more medium (air, fluid, solid, etc.) between reader 24 and a token 35. Examples of suitable carriers include RF radiation, microwave radiation, and infrared radiation, electric fields, magnetic fields, and the like. If the system employs RF radiation, the frequency may range between 125 kHz and 5800 MHz and may be provided at a power of between about 7 and 2 Watts, respectively (as specified by the IEEE). In a specific embodiment, reader 4 may operate at an approved frequency at or near that used for an available RFID device; e.g., near 125 kHz in one case and about 13 MHz in another case. Microwave radiation provides another suitable carrier. Generally, microwave provides the same functionality as RF radiation, but at larger read ranges. In addition, any approved or regulated band such as the ISM bands at 945 MHz, 5.8 GHz and 2.45 GHz may be used. Reader 4 may also employ a multi-band or multi-frequency source having one frequency to supply power and a second frequency for interrogation, for example.

In operation, each token reader 24 probes tokens 35 in its read range. Reader 24 provides a wireless probe signal that triggers token 35 to respond with its identity and authentication information.

When probed by reader 24, token 35 replies with its ID code (from identification tag 66 or memory component 68) and optionally any ownership data contained in memory component 68. In a specific embodiment, the signal provided by reader 24 also provides the energy for token 35 to reply.

Reader 24 then detects the token 35 reply, and a processor local to the reader 24 converts that reply to signal suitable for transmission a computer system or server. The ID code provides a means for the server to automatically log data corresponding to individual portable RFID devices 35.

Reader 24 is configured to interrogate multiple tokens 35 simultaneously. This allows the reader to interrogate a large number of tokens 35 at table 25. Some identifier tag/interrogation systems are designed to be polled one at a time (serially), while other interrogators are able to poll multiple tokens 35 simultaneously. Communications strategies typically make use of anti-collision and arbitration procedures that control the time when a tag responds to a probe. In a specific embodiment, each reader 4 includes its own processor, control logic, transceiver and interrogator antenna adapted to interrogate multiple tokens 35 simultaneously.

Reader 24 provides a probing signal (and optionally power) to a token 35. In a specific embodiment, each reader

24 provides: sufficient radiated power to energize each token 35 at a desired read rate, sufficient bandwidth to interrogate numerous tokens 35 in a reasonable amount of time, sufficient sensitivity to accurately obtain a response from each token, processing or interrogation means to discriminate between nearby tokens 35 in its reading range, and a suitable interface to a computer or server to access a token 35 database. Reader 24 can accomplish the first task by transmitting an electromagnetic signal in the form of continuous wave, spread-spectrum waveform, impulse, or coded waveform to energize the tag.

A passive token 35 may rectify an incident RF signal coming from reader 24 to provide DC power for internal token processing. In one embodiment, once activated, token 35 modulates the incident carrier with its ID code and provides a modulated backscatter signal. The response signal may be at a frequency different from that of the incident signal. Reader 24 detects this modulated backscattered signal and translates the identification number and authentication data for the token into a suitable format for communication with a server 15.

Although not shown, the present invention is suitable for other types of tables used in a gaming property. These include: blackjack tables, craps tables, baccarat tables, roulette tables, poker tables, for example.

Reader 24 is not limited to use at a table. A reader 24 may also be installed in a gaming machine to allow token 35 usage and player authentication at a gaming machine. Alternatively, reader 24 may be located at one or more kiosks in the casino, or an entry/exit doors to automatically poll portable gaming devices 35 entering and leaving the property or a service in the casino. In another embodiment, reader 24 is non-stationary and portable, by casino personnel for example.

In addition, although portable RFID devices have been described with respect to portable tokens that resemble coins, tracking systems included herein may use other portable RFID devices. Suitable portable RFID devices include: cards, PDA's, cellular phones, mobile gaming devices, mobile kiosk Devices, and bluetooth headset devices, for example. In each case, the portable RFID device includes RFID technology configured to communicate with an RFID reader. Other portable RFID devices are also suitable for use herein.

An RFID tracking system enables data to be transmitted by portable instruments 304 passively to enable patron tracking without requiring a patron to do anything—and anywhere where readers are installed. For example, location of a patron may be detected each time a person approaches a reader 24. Since readers may be installed at each gaming device in a casino (gaming machine, card table, etc.), at each entry or exit, in hallways of the hotel near rooms, and at service such as restaurants and shops, the person may be tracked—in real-time—as they move through a casino property from the time they enter to the time they leave. This data collection need not be acted upon immediately, and may just be stored to increase the pool of collected information.

In one embodiment, patron movement is stored as a traffic pattern for that person. FIG. 6 shows sample traffic patterns 80*a* and 80*b* for two people 4*a* and 4*b*, respectively, in a casino 13 in accordance with a specific embodiment of the present invention.

As the term is used herein, a traffic pattern refers to the route(s) a person takes in a casino property. In this case, person 4*a* entered the casino through external doors 84, played a game at three different gaming machines 2, had lunch at restaurant 86, and then left casino 13 through doors 84. A person may make multiple routes in a casino. For example, when the person stays in a hotel with the casino, a route may be designated as each time the person enters the casino floor, each time they leave their room, or each time they enter the casino grounds. Person 4*b* began route 80*b* from a hotel room 83 in the casino, took an elevator 85 down to the casino floor, and then proceeded to a blackjack table 25, then to kiosk 205, then to a poker table 25, and then out an external casino door.

The traffic pattern may also log activities taken by the patron at one or more destinations. Activities are shown in FIG. 6 as dots 88 along each traffic pattern 80. Data may be logged from each activity. For example, if the person played a game on a gaming machine, then all data from the gaming machine interaction may be logged, such as duration of play, what games were played, wager amounts, etc.

All the data from each traffic pattern 80 is then sent to a central server. In one embodiment, the server stores data for that person if their identity is known. The traffic pattern may also be associated with demographic information for that person, if known.

Casino 13 includes numerous RFID readers 24 disposed throughout the property. When an RFID tag passes through the electromagnetic zone of a reader 24 in casino 13, the tag detects the reader's activation signal. The reader decodes the data encoded in the tag and the data is passed to the server.

RFID devices 304 allow each person 4 to be tracked throughout the casino. By using RFID devices, casino management knows the identity of a patron at a gaming machine even if the patron did not insert a card.

Again, the present invention may use other portable devices with RFID tags to track patron activities. For example, if the casino has a retail shop, then each retail item may be tagged with an RFID device. When purchased by a user, data transmitted by a retail item tag may include: identification or location information, and/or specifics about the product tagged, such as price, color, date of purchase, etc.

Automated video surveillance and storage of patron behavior data are also suitable for use herein. In this case, one or more cameras are installed in casino and used to view and record patron behavior-related activities in a casino. This is accomplished by providing a network of cameras, one or more servers, and at least one storage medium for storing video clips and other patron behavior data. Video clips can then be captured, recorded, and automatically associated with patrons based on biometric identification, and optionally associated with one or more patron behavior data identifiers that characterize patron behavior. For example, the patron behavior data identifiers may include: playing a game, entering a restaurant, sitting at a card table and playing a card game, what times these activities occur, their duration, etc.

Passive monitoring and wireless tracking of patrons enables a casino to analyze movement and behaviors at a level not possible in today's casino. A patron can be tracked from the time they walk through the door of a casino until the time they leave. The behavior data 3 then includes where a patron went in a casino property and how much time they spent in each location.

Over time, patron tracking of multiple people permits a casino to better understand behaviors and habits of their patrons. This allows the casino to configure the property to guide patron experience and increase revenue. Such macro-casino actions resulting from improved information collection as described herein.

The tailored offerings process may be centralized in a game server. In one embodiment, the server is located on a casino property and run by one or more casino operators. In one embodiment, the server is located remotely from the casino property and run by a gaming service provider, such as IGT of Reno, Nev.

Figure 7:
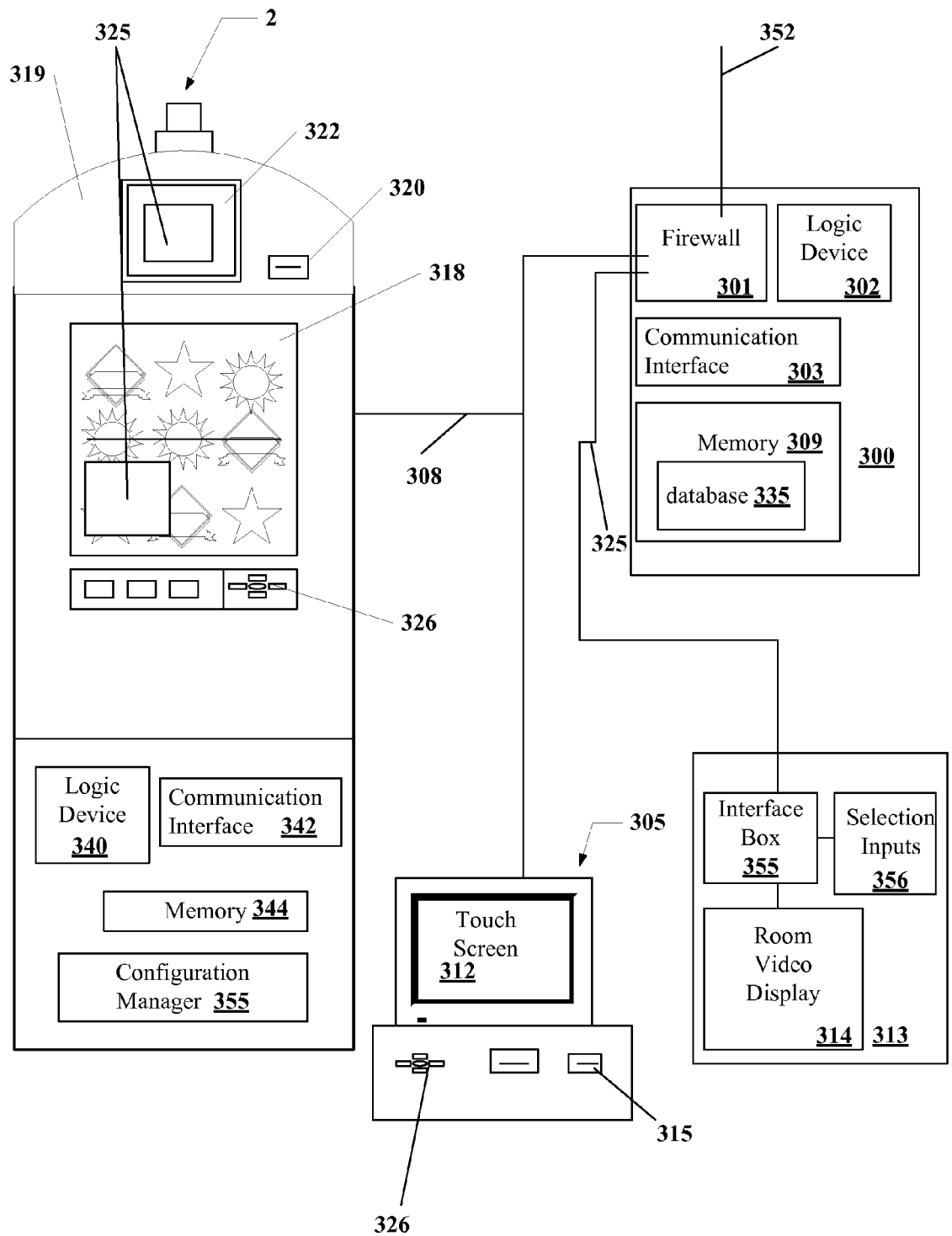
FIG. 7 pictorially shows a block diagram of a server connected to a number of local and wide area networks in accordance with one embodiment of the present invention.

FIG. 7 shows a block diagram of a data collection and tailored offerings server 300 connected to a gaming machine 2, kiosk 305 and room access 313 in accordance with another embodiment of the present invention.

A player may provide behavioral data and identify himself on gaming machine 2 by entering information into gaming machine 2 using an input interface of some type. The input interface may be a card reader 320, a video touch screen 318, selection inputs 326, a key pad, button pad, a mouse, a track ball, a touch pad, a joy stick, a wireless interface, a biometric input device and combinations thereof. The biometric input device may include a finger print reader, a retina scanner, a camera and a microphone.

The retrieval of tailored offerings by gaming machine 2 may be influenced by one or more player inputs. The player inputs may be received by the gaming machine 2 using one or more input devices including but not limited to a video touch screen 318, a button panel 326, a track ball, a mouse, a microphone, a card reader, a joy stick, a touch pad, a wireless interface, a key pad and combinations thereof. For example, in some embodiments, the gaming machine may ask a player for a confirmation input before the gaming machine reconfigures itself according to tailored offerings such as a new game provided by server 300.

In other embodiments, the gaming machine 2 automatically reconfigures itself, using the configuration manager 355, according to recommended games and other tailored offerings stored for the player without confirmation input by the player.

Gaming machine 2 also includes a processing and communication system that includes processor 340, communication interface 342, and memory 344.

In one embodiment, processor 340 represents the main processor or a component control processor for gaming machine 2. When acting under the control of appropriate software or firmware, processor (or CPU, or logic device) 340 implements game play and data collection as described herein. CPU 340 may include one or more processors such as a processor from the Motorola family of microprocessors or the MIPS family of microprocessors. In an alternative embodiment, processor 340 is specially designed hardware for controlling the operations of a gaming machine. In one embodiment, one of memories 344 (such as non-volatile RAM and/or ROM) also forms part of CPU 340. However, there are many different ways in which memory could be coupled to the processing system.

Communication interfaces 342 control the sending and receiving of data to and from gaming machine 2. Suitable hardware interfaces and their respective protocols may include USB interfaces, Ethernet interfaces, cable interfaces, wireless interfaces, dial up interfaces, and the like.

Memory 344 stores instructions and software for implementing methods and techniques as described herein, and may include any suitable memory source. Such memory components are available from a wide variety of vendors. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

When gaming machine 2 retrieves tailored offerings and other instructions from server 300, a master gaming controller (such as processor 340) that controls one or more games played on the gaming machine 2 sends a request to the remote server 300 using a communication interface within the gaming machine (not shown) connected to local area network 308. The request for tailored offerings and preference account information may be encapsulated in one or more messages of some type. The gaming machine 2 may also send messages to server 300 that include information to be stored in server 300 or include commands for server 300 to execute.

Server 300 may receive the one or more messages via a communication interface 303 connected through a firewall 301. The messages may be received from a gaming machine, such as 2, a kiosk, such as 305 or a room access interface, such as 313. A logic device 302 within server 300 is designed or configured to execute one or more software applications that select games based on the receipt of behavioral data and/or to send tailored offerings. A memory 309 stores one or more of: a list of available entertainment resources (e.g., to a casino where gaming machine 2 is located), tailored offering selection software, tailored offering data for one or more people or demographic groups, etc. Memory 309 may include a hard drive or some other appropriate storage medium. Communication interface 303 connects to one or more local area networks, such as 308 or 325, and a wide area network 352 such as the Internet.

While not shown, server 300 may also include communication with other systems including: hotel operation, POS systems, retail and beverage outlets, and other systems that may be unique to a casino or other gaming enterprise.

In memory 309, server 300 stores behavior data 3, entertainment resources data 11. The behavior data 3 may include real-time movement data, behavior patterns demographic knowledge, etc. The entertainment resources data 11 may include gaming data, non-gaming data, etc.

In one embodiment, server 300 implements a model that automatically selects tailored offerings. The model may include data mining systems and methods that filter the behavior data 3 and entertainment resources data 11 and select tailored offerings for a person. Different people enjoy different offerings, and the automatic process, e.g., as implemented in software, selects offerings for an individual based a) on partial or full identification, and b) data mining criteria established to convert behavior data 3 and entertainment resources data 11 into tailored offerings. This filtering process reduces a total number of entertainment resources offered by a gaming establishment to a lesser number that is likely to interest a person.

The present invention contemplates a wide range of suitable selection criteria for filtering entertainment resources. In one embodiment, the tailored offering process applies a weight for each personal criterion associated with the behavioral data that affects how relevant the criterion is relative to the other information. For example, a weighting function that includes weights based on a personal survey or prior game play permits control of selection criteria by adjusting the weights (e.g., from 0 to 1 or from 0 to 100), e.g., as the person plays a game more, a weight for that specific game and/or a weight for its genre increases. The weight also permit a system designer to choose what personal information is used in the selection process (giving weights of '0' or low weight devalues its corresponding personal information), and what value it is given relative to other personal information. Other techniques for selecting games using personal game selection information are contemplated.

In one embodiment, the data mining and game selection process is configurable. First, a system designer may determine which personal game selection information is used. Second, the system designer also determines the relative weight or value of each bit of personal information. When the personal information and/or criterion weights are altered, the selection process usually produces a different tailored offerings for a person. This permits a casino traffic controller to sculpt the tailored offering selection process. Casinos and other gaming establishments 13 value their own expertise in patronage. Configurability in the selection process permits a casino to control and tailor offerings to its patrons, to promote various games or improve service according to their own standards and values of customer patronage. In general, configurability allows any system designer or gaming establishment to controllably mine tailored offerings for each person 4 and each gaming establishment.

As time passes, a designer may change the data mining criteria and/or weights. Again, this usually produces different tailored offerings. For example, a casino or other gaming establishment may alter tailored offerings over time by manipulating the criteria. This allows the casino to select new sets of games for an individual, or encourage certain games for business purposes (e.g., a new game they are promoting). The behavioral data 3 may also be updated for a person (as they play more games and more information is recorded) or a demographic that the person belongs to, which may also produce new tailored offerings for that person, given the same selection criteria.

As a result of the tailored offerings, such as a list of recommended games, a player might discover a new favorite game that they previously did not know about, play the game a lot, play more often in the responsible casino 13, and have a generally more pleasant experience with casino gaming and that casino 13. On a mass consumer scale, offering tailored offerings may also increase player enjoyment and participation, increase player exposure to different games and entertainment services, and speed adoption of new games and entertainment services.

Although the present invention has been described with respect to a weighted algorithm for selecting tailored offerings, it is contemplated that other selection software is suitable for use for selecting tailored offerings. For example, a database 335 stored in memory 309, such as a relational database, may be configured to produce tailored offerings using stored logic, behavioral data 3 and entertainment resources data 11. In one embodiment, the selection software includes commercially available software adapted to select tailored offerings. One suitable software package includes SQL Server 2005 as provided by Microsoft, Inc. of Redmond, Wash., and adapted to select tailored offerings as described herein. The server 300 and its database 335 may thus store basic relational activity for gaming and non-gaming activities. In addition, the database could store dimensional models with fact and dimension tables similar to that of a data warehouse.

Selection may also include human input. In one embodiment, server 300 also stores dynamic data that is compiled and delivered to key casino management for real-time decisions. One example of this is proximity tracking at a targeted location in a casino where a small population of patrons is located. With the real-time wireless people tracking described above, a casino manager could make real-time decisions of what games should be displayed in that location based on the demographic make-up of the population.

Server 300 and its database 335 may also be used to determine advanced profiles of what a patron is worth to a casino, e.g., based on demographic profile(s). In this example the database could be a repository that collected data from external and internal sources that allow a casino to reasonably predict how valuable a patron will be. In this case, server 300 includes a management program which updates a theoretical win profile for the respective customer as a function of estimated winnings from the betting activity of the customer at the casino establishment over a time period.

Server 300 may also collect and store real-time knowledge of where patrons are going and how long they are spending at a given location. This may be used to map traffic patterns over time, which allows a casino to optimize their entertainment offerings based on traffic patterns—and to direct patrons to where the casino wants patrons to go so as to increase earnings. Knowledge of who patrons are at any given time permits a casino to maximize play by having games on a floor that the current patrons are interested in.

Tailored offerings as described herein also improve the provision of targeted bonuses and enterprise promotions. Targeted bonuses refer to awards that are selected using full identification or partial identification (e.g., using demographic information) for the person. One example is a promotion with tailored awards based on where a player lives. For instance, if the promotional winner is from Montana, then the award could be a four-wheel drive vehicle. On the other hand, if a player is from San Diego, the award may be a convertible sports car. Other examples could be stated based on any known demographic characteristics of a player, age, gender, etc. Enterprise promotions refer to awards provided by a casino or other gaming establishment. For a casino enterprise with properties geographically distributed nationally or internationally, one enterprise promotion example is a casino may base an award on known preferences or other demographic information. For instance, if the winner of a promotion is known to like warm weather or outdoor activities, the enterprise promotion award could be a vacation to one of their enterprise's properties near a tropical beach.

Targeted bonuses may be implemented at a property, regional or global level. Demographic and/or geographic awards may be awarded based on what a casino knows about a particular patron(s). In the case of global casino corporations, the casino may promote an offering at a property half way around the world if the behavioral or personal data for that a target person indicated that the patron wanted to visit that location. This tourism data could be based on historical behavior, internal/external predictors based on behavior data, internet browsing at the property, etc.

In one embodiment, the server manages a reward system. One suitable reward system uses loyalty points to enumerate tailored offerings and value repeated patronage.

Loyalty points refers to any type of points accrued for participating in designated activities at a gaming establishment. Designated activities include, but are not limited to, gaming activity such as playing gaming machines, card games such as black jack, pai gow poker, baccarat and poker, betting on public event outcomes, table games such as roulette, craps, keno and lotteries, etc. Other patronage activities at gaming establishments may accrue loyalty points. In one sense, loyalty points represent a form of credit accrued for patronage. The points can be stored on a ticket and redeemed for a variety of goods or services (or translated to other forms of credit) within a gaming establishment or affiliated establishment. Player tracking points are a typical example of "loyalty points."

FIG. 6 is a block diagram of a server 300 connected to a gaming machine 2, kiosk 305 and room access 313 in accordance with another embodiment of the present invention. Server 300 is well suited to offer tailored offerings, loyalty point programs and manage preference accounts, for example.

A player may begin a game play session on the gaming machine 2 by entering identification information into the gaming machine 2 using an input interface of some type. The input interface may be a card reader 320, a video touch screen 318, selection inputs 326, a key pad, button pad, a mouse, a track ball, a touch pad, a joy stick, a wireless interface, a biometric input device and combinations thereof. The biometric input device may be one of but is not limited to a finger print reader, a retina scanner, a camera and a microphone.

Server 300 receives data from the entertainment resources shown in FIG. 6 to track each transaction to form a player spending profile (for each person and/or cumulatively for a demographic group).

Server 300 allows a patron to loyalty redeem points at any touch point in a casino enterprise based on a set of parameters established by the casino, set by the preferences of the patron, or set automatically by the system based upon the program of the day.

The retrieval of tailored offerings (such as recommended games) and preference account information by gaming machine 2 may be influenced by one or more player inputs. The player inputs may be received by the gaming machine 2 using one or more input devices including but not limited to a video touch screen 318, a button panel 326, a track ball, a mouse, a microphone, a card reader, a joy stick, a touch pad, a wireless interface, a key pad and combinations thereof. For example, in some embodiments, the gaming machine may ask the player for a confirmation input before the gaming machine reconfigures itself according to preference account information stored in the player's preference account.

In other embodiments, the gaming machine 2 automatically reconfigures itself, using the configuration manager 355, according to recommended games and preference account information stored for the player without the confirmation input by the player. In another example, the player may request to view or modify personal account information such as their set(s) of recommended games and other tailored offerings. In this case, the gaming machine retrieves the personal account information from the source where it is located and displays the requested information using an interface such as 325. The interface may be displayed on a primary display such as 318 integrated into the main cabinet of the gaming machine 2 or a secondary display, such as 322, in a top box 319 mounted on top of the gaming machine 2.

Gaming machine 2 also includes a processing and communication system that includes processor 340, communication interface 342, and memory 344.

In one embodiment, processor 340 represents the main processor or a component control processor for gaming machine 2. When acting under the control of appropriate software or firmware, processor (or CPU, or logic device) 340 implements game play and tailored offerings functions as described herein. CPU 340 may include one or more processors such as a processor from the Motorola family of microprocessors or the MIPS family of microprocessors. In an alternative embodiment, processor 340 is specially designed hardware for controlling the operations of a gaming machine. In one embodiment, one of memories 344 (such as non-volatile RAM and/or ROM) also forms part of CPU 340. However, there are many different ways in which memory could be coupled to the processing system.

Communication interfaces 342 control the sending and receiving of data to and from gaming machine 2. Suitable hardware interfaces and their respective protocols may include USB interfaces, Ethernet interfaces, cable interfaces, wireless interfaces, dial up interfaces, and the like.

Memory 344 stores instructions and software for implementing methods and techniques as described herein, and may include any suitable memory source. Such memory components are available from a wide variety of vendors. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

When the gaming machine 2 retrieves tailored offerings and preference account information from server 300, a master gaming controller (such as processor 340) that controls one or more games played on the gaming machine 2 sends a request to the remote server 300 using a communication interface within the gaming machine (not shown) connected to local area network 308. The request for tailored offerings and preference account information may be encapsulated in one or more messages of some type. The gaming machine 2 may also send messages to server 300 that include preference account information to be stored in server 300 or include commands for server 300 to execute. For instance, a player may request one or more modifications be made to their personal account information to be stored to server 300.

Server 300 may receive the one or more messages via a communication interface 303 connected through a firewall 301. The messages may be received from a gaming machine, such as 2, a kiosk, such as 305 or a room access interface, such as 313. A logic device 302 within server 300 is designed or configured to execute one or more software applications that select games based on the receipt of personal game selection information. In addition, the logic device may designed or configured to execute software applications that allows preference account information stored in a plurality of different preference accounts to be modified from an external device such as a gaming machine 2, kiosk 305 or room access interface 314. A memory 309 stores one or more of: a list of available games (e.g., to a casino where gaming machine 2 is located), recommended game selection software, personal game selection information for one or more people, etc. Memory 309 may include a hard drive or some other appropriate storage medium. Communication interface 303 connects to one or more local area networks, such as 308 or 325, and a wide area network 352 such as the Internet. In some embodiments, the preference account interfaces generated by server 300 may be accessed via a web browser.

Some information stored on server 300 may be accessed and modified via kiosk 305 and room access interface 313. For kiosk 305, a player may view and modify recommended games and preference account information stored on server 300 using a touch screen 312, selection inputs 327 and a card reader 315.

In one embodiment, the patron tracking is used in conjunction with a loyalty point program or other frequent patronage reward system. Loyalty point sessions are sessions during which a person is performing the designated activity and during which loyalty points accrue. Examples of events that trigger accrual of loyalty points include a player beginning to play a particular gaming machine, a player providing cash or indicia of credit to a gaming machine, a user actuating a mechanism allowing anonymous gaming activity, etc.

A casino may award loyalty points to patrons as desired. For example, point accumulation may occur faster in a casino than in retail stores around the casino. Or the accumulation of points may occur faster in a hotel then at the casino. In any case, server 300 provides a model with parameters to establish a plurality of point accumulation programs across the enterprise. In one embodiment, point accumulation is modeled using a weighted algorithm for all inputs and each loyalty point parameter is fit with a weight that may be adjusted by a casino operator over time.

In a specific embodiment, the model allows server 300 to flexibly and automatically change point accumulation parameters based on one or more criteria. For example, weights for each of the criteria may be altered to vary their respective effects in determining selected offerings. Such criteria may include varying weights during: holidays, time of year, time of day, spend rate, patron tiers or target spend parameters, for example.

The loyalty point weights may also be adapted for promotional events. In a specific embodiment, the server 300 and loyalty point weighted algorithm enables a casino operator to establish an event from a single user terminal connected to the server, such as kiosk 205 or room access 214. Server 300 then ripples such interaction through all the applicable disparate systems, enabling the key parameters to affect the operation of point collection through the entire system and each gaming device in the system. For example, a 2-night stay at a hotel/casino may be converted by a casino operator to loyalty point bonus options for a patron as a selection of casino gaming redemption possibilities—such as a $10 promotional voucher, $15 in extra bonus credit that can be played on slots in the casino, or a 2 for 1 bet voucher on any table game.

The system may also improve patron communication. This may occur through direct mail or by enabling an internet connection, for example. The patron is then informed of what they can use their points for, current point balances across each venue within the casino enterprise when the enterprise owns multiple sites, and any special promotions based on redemptions occurring at a special time, place or amount.

Figure 8:
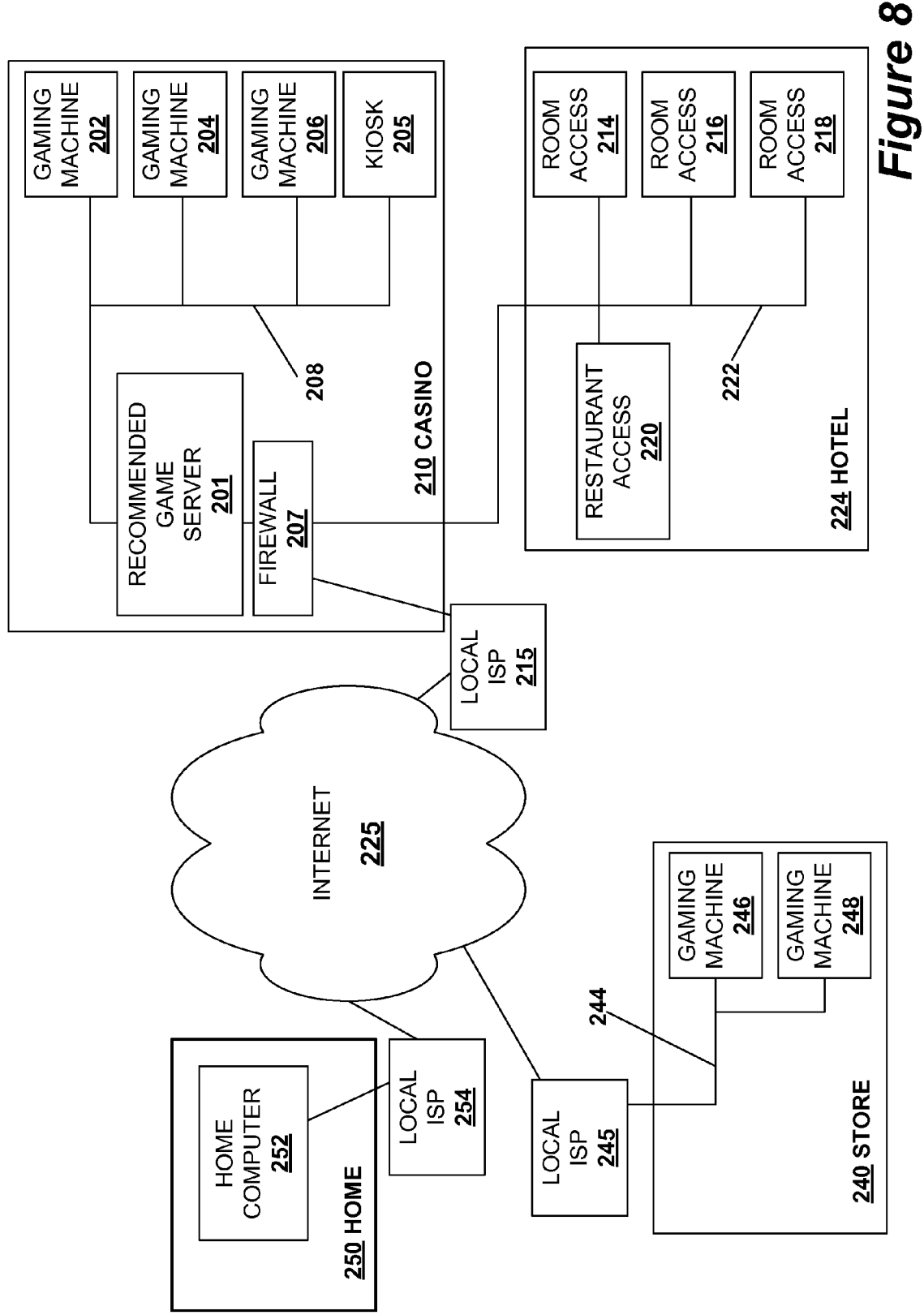
FIG. 8 shows a block diagram of a number of gaming machines connected to a server providing associated services, such as accounting, player tracking and player authentication.

The present invention contemplates many services and benefits—both existing and new—that are enabled by the present invention. Some services and tailored offerings are provided to individual players as described above with respect to FIG. 1. Other uses of data collection described herein benefit a casino on a macro level, and will be described in further detail with respect to FIG. 8. Additional suitable tailored offerings provided to individual players will now be provided.

Services and incentive awards may include any prize, item or services items offered by a casino or gaming establishment that have monetary value or otherwise attract patrons to the gaming establishment. Such incentives may include meals and food service, rooms and room service, entertainment shows, promotional game play, or concerts and events at which tickets, vouchers or the like that may be issued and redeemed or used at selected events. Other incentive awards are suitable for use herein.

New services enabled by the present invention include authentication of wireless devices, which may be dropped, lost, stolen, or otherwise in the hands of an unintended person. Security and validation that a patron playing the mobile gaming device is of age is a concern to many casinos. One service enabled by the present invention is to require biometric identification (thumb or finger print) to activate a mobile gaming device. If the biometric pattern does not match the expected pattern stored in a database for server 15, the mobile gaming device cannot be activated.

The tracking described herein also permits improved service for mobile gaming devices 312. If a mobile gaming device locks up or breaks, casino personnel may bring a player a new unit. The server 15 would transfer the biometric info and credits to the new unit; the casino personnel hands the new unit to the player; and the device is activated and the casino personnel would take the old unit.

Another service provided by the tailored offerings described herein is on/off provision of games. For example, wireless tracking of mobile gaming devices 312 may be used to disable a device when in an area that would violate gaming regulations.

Another service enabled by techniques described herein includes mobile gaming device 312 security and management. If a patron attempted to remove a device from a casino, then an alert or alarm may be activated.

Arcade type games may be offered to patrons on mobile gaming devices 312. This is useful in jurisdictions where loss limits apply. When a casino gaming patron reaches his/her loss limit, the device 312 or gaming machine 2 may still be used to play arcade type games. These games may be charged to the patron based on time played.

The increase in knowledge of patron location and behavior allows a casino to utilize push marketing. Push marketing refers to advertising directly to patrons in a casino based on their identity—either full or partial. For example, marketing and advertising materials may be delivered to a mobile gaming device 312, a gaming machine 2, or a video screen 9 when the demographic make-up of a patron or group of patrons (e.g., five young men moving together) is a target for a particular product or offering. Again, this may be done in real-time.

Figure 9:
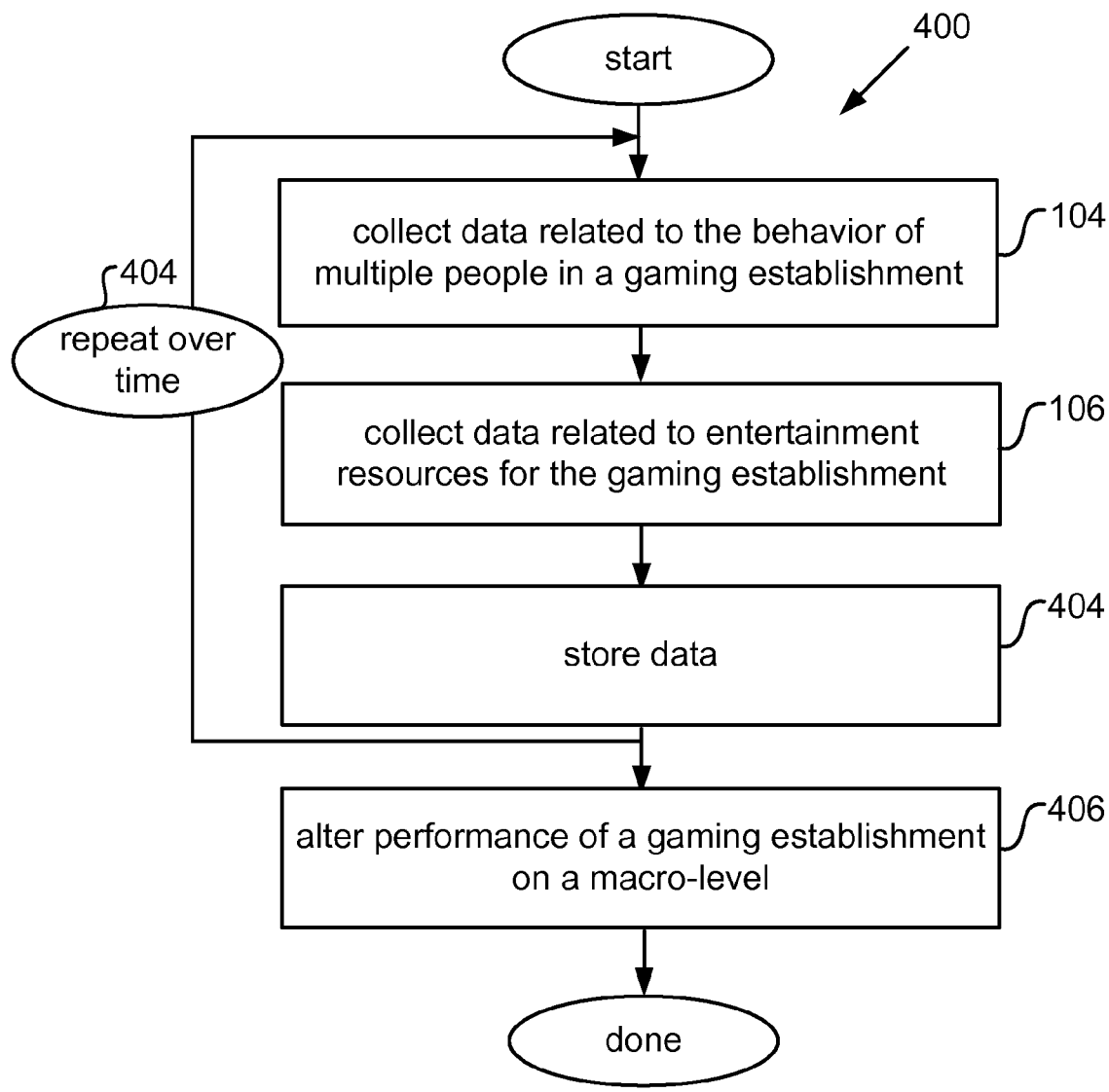
FIG. 9 shows a method of using data collected in a gaming establishment in accordance with a specific embodiment of the present invention.

Data collected by the systems and methods described herein also permits a casino to make better decisions on a macro level. FIG. 9 shows a method of using data collected in a gaming establishment in accordance with a specific embodiment of the present invention.

Method 400 begins and continuously proceeds with collecting data related to the behavior of multiple people in a gaming establishment (104). Several techniques suitable for identifying and tracking a person and their behavior in a casino were described above. Method 400 then collects data for entertainment resources for the gaming establishment (106 and FIG. 4).

Data collection may repeat over time (402) and thus accumulate more data. The data may be stored (404) in a central server and catalogued as desired. For example, data for each person may be marked according to any meta-data included in the incoming data, such as: the person and/or demographic, the activities the person did, locations, time, etc. The central server and its unified database may then activity for gaming and non-gaming activities.

The data is then used, as appropriate, to alter the layout or performance of a gaming establishment on a macro-level (406). In one embodiment, the stored traffic patterns for hundreds or thousands of patrons permit a casino operator to reconfigure a floor plan and move gaming machines, card tables and other entertainment resources to better match the traffic patterns and thereby improve revenues.

In a specific embodiment, the casino operator dynamically configures all or part of a casino floor to a theme targeted at a predetermined population of patrons, such as that determined by demographic labeling of the group. The configuration of the gaming machines and other entertainment resources may be controlled with a predetermined theme or alternatively the patrons may activate their favorite theme interactively at a gaming machine. The predetermined theme may be selected according to patron characteristics including, for example, nationality, ethnic origin, gender, racial identity, geographic origin, favorite hobby, political association, sexual orientation, preferred sport, musical idol or genre, age and/or faith of the patrons of the plurality of gaming machines. The casino may also include video cameras and microphones, at locations monitoring a group of gaming machines or fitted on each gaming machines, and recognition software for recognizing patrons' characteristics such as age group, clothing style, hair color, isolated person or a party of persons, language spoken, and ethnic origin in order to collect information for such configurations in the future and thus allow a casino operator to dynamically adapt the entertainment resources' theme accordingly.

In another embodiment, the data is used with a dimensional model that maps traffic patterns for efficiency and mass person modeling purposes. Reconfigurations can then be made to increase or decrease patron interaction as determined by the dimensional model and as desired by a casino operator.

Casinos and other gaming establishments value their own expertise in patronage. Flexible use of the accumulated data permits a casino to control and tailor macro-level offerings to its patrons, to promote various games or improve service according to their own standards and values of customer patronage. In general, data collection as described herein allows a casino operator to controllably mine behavior data to improve service across the entire gaming establishment.

This server may also store dynamic data that could be compiled and delivered to key casino management for decisions in real-time and on the macro-level, such as changing games in a part of a casino due to the presence of numerous members of a Science Fiction convention or other convention in the casino for a day or two.

While this invention has been described in terms of several preferred embodiments, there are alterations, permutations, and equivalents that fall within the scope of this invention which have been omitted for brevity's sake. It is understood that the present invention need not include one or more heat transfer appendages. It is therefore intended that the scope of the invention should be determined with reference to the appended claims.

What is claimed is:

1. A method comprising:
   (A) receiving at a server, said server comprising a database, personal information associated with multiple persons in a gaming establishment;
   (B) causing the server to store in the database:
      (a) said received personal information;
      (b) for each of a plurality of different entertainment resources, one or more resource metadata values that characterize said entertainment resource;
      (c) for each of a plurality of different demographic categories, at least one demographic characteristic associated with said demographic category; and
      (d) for each demographic category, for each resource metadata value of each entertainment resource, a resource weight representing a relevancy of said resource metadata value to said demographic category;
   (C) receiving at the server an identification of at least one personal characteristic of a first one of the persons in the gaming establishment;
   (D) receiving at the server a location of the first person within the gaming establishment; and
   (E) for the first person, in real-time:
      (a) causing the server to compare the identified at least one personal characteristic of the first person with the at least one demographic characteristic of one or more of the demographic categories;
      (b) based on said comparison, causing the server to assign the first person to one of the demographic categories;
      (c) causing the server to, for each of a plurality of the entertainment resources, determine a desirability ranking for said entertainment resource by:
         (i) for each resource metadata value associated with said entertainment resource, multiplying said resource metadata value by the resource weight of the assigned demographic category associated with said resource metadata value; and
         (ii) summing the products of said multiplications;
      (d) causing the server to select a tailored offer for the first person from the plurality of the entertainment resources based on the determined desirability rankings, wherein the selected tailored offer comprises at least one of the entertainment resources having the highest desirability rankings;
      (e) causing the server to select one of a plurality of different devices based on the location of the first person; and
      (f) causing the selected device to provide the selected tailored offer to the first person.

2. The method of claim 1, wherein the plurality of entertainment resources comprise one or more of the following: games of chance, advertisements, and services.

3. The method of claim 1, wherein each resource metadata value comprises a numeric value that represents characteristics of resource metadata.

4. The method of claim 1, wherein each resource metadata value comprises one or more of the following:
   a genre of a game of chance,
   an indication of a presence of a bonus game of chance,
   an indication of a presence of multiple paylines, and
   an indication of a presence of a progressive game of chance.

5. The method of claim 1, wherein the identified at least one personal characteristic of the first person comprises one or more of the following:
- a number of times the first person has played a particular game of chance,
- a genre of games preferred by the first person,
- the first person's age,
- an indication of the first person's preference for a particular bonus game, and
- an indication of the first person's preference for games of chance having multiple paylines.

6. The method of claim 1, wherein for at least one demographic category, one of the at least one demographic characteristic associated with said at least one demographic category is one of a genre of games, a genre of media, age, gender, country of origin, education level, annual income, occupation, and marital status.

7. The method of claim 1, wherein for at least one demographic category, one of the at least one demographic characteristic associated with said at least one demographic category comprises historical game play data, interests data, preferences data for the first person, or a combination thereof.

8. The method of claim 1, wherein the selected tailored offer includes the entertainment resource having the highest desirability ranking.

9. The method of claim 1, wherein the selected device is a gaming machine and the selected tailored offer comprises one or more of: a game of chance and an advertisement.

10. The method of claim 1, wherein the location of the first person is a target location.

11. A non-transitory computer readable medium including a plurality of instructions which, when executed by at least one processor, cause the at least one processor to:
(A) receive personal information associated with multiple persons in a gaming establishment,
(B) store in a database:
   (a) said received personal information;
   (b) for each of a plurality of different entertainment resources, one or more resource metadata values that characterize said entertainment resource;
   (c) for each of a plurality of different demographic categories, at least one demographic characteristic associated with said demographic category; and
   (d) for each demographic category, for each resource metadata value of each entertainment resource, a resource weight representing a relevancy of said resource metadata value to said demographic category;
(C) receive an identification of at least one personal characteristic of a first one of the persons in the gaming establishment;
(D) receive a location of the first person within the gaming establishment; and
(E) for the first person, in real-time:
   (a) compare the identified at least one personal characteristic of the first person with the at least one demographic characteristic of one or more of the demographic categories;
   (b) based on said comparison, assign the first person to one of the demographic categories;
   (c) for each of a plurality of the entertainment resources, determine a desirability ranking for said entertainment resource by:
      (i) for each resource metadata value associated with said entertainment resource, multiplying said resource metadata value by the resource weight of the assigned demographic category associated with said resource metadata value; and
      (ii) summing the products of said multiplications;
   (d) select a tailored offer for the first person from the plurality of the entertainment resources based on the determined desirability rankings, wherein the selected tailored offer comprises at least one of the entertainment resources having the highest desirability rankings;
   (e) select one of a plurality of different devices based on the location of the first person; and
   (f) cause the selected device to provide the tailored offer to the first person.

12. The non-transitory computer readable medium of claim 11, wherein the entertainment resources comprise one or more of the following: games of chance, advertisements, and services.

13. The non-transitory computer readable medium of claim 11, wherein each resource metadata value comprises one or more of the following:
- a genre of a game of chance,
- an indication of a presence of a bonus game of chance,
- an indication of a presence of multiple paylines, and
- an indication of a presence of a progressive game of chance.

14. The non-transitory computer readable medium of claim 11, wherein the identified at least one personal characteristic of the first person comprises one or more of the following:
- a number of times the first person has played a particular game of chance,
- a genre of games preferred by the first person,
- the person's age,
- an indication of the first person's preference for a particular bonus game, and
- an indication of the first person's preference for games of chance having multiple paylines.

15. The non-transitory computer readable medium of claim 11, wherein for at least one demographic category, one of the at least one demographic characteristic associated with said at least one demographic category comprises historical game play data, interests data, preferences data for the first person, or a combination thereof.

16. The non-transitory computer readable medium of claim 11, wherein the selected device is a gaming device and the selected tailored offer comprises one or more: a game of chance and an advertisement.

17. The non-transitory computer readable medium of claim 11, wherein the location of the first person is a target location.

18. A system comprising:
- a plurality of display devices;
- a communication network; and
- a server including at least one processor and at least one memory device that stores a plurality of instructions which, when executed by the at least one processor, cause the at least one processor to:
(A) receive personal information associated with multiple persons in a gaming establishment,
(B) store in a database:
   (a) said received personal information;
   (b) for each of a plurality of different entertainment resources, one or more resource metadata values that characterize said entertainment resource;
   (c) for each of a plurality of different demographic categories, at least one demographic characteristic associated with said demographic category; and
   (d) for each demographic category, for each resource metadata value of each entertainment resource, a resource weight representing a relevancy of said resource metadata value to said demographic category;

(C) receive an identification of at least one personal characteristic of a first one of the persons in the gaming establishment;

(D) receive a location of the first person within the gaming establishment; and (E) for the first person, in real-time:
  (a) compare the identified at least one personal characteristic of the first person with the at least one demographic characteristic of one or more of the demographic categories;
  (b) based on said comparison, assign the first person to one of the demographic categories;
  (c) for each of a plurality of the entertainment resources, determine a desirability ranking for said entertainment resource by:
    (i) for each resource metadata value associated with said entertainment resource, multiplying said resource metadata value by the resource weight of the assigned demographic category associated with said resource metadata value; and
    (ii) summing the products of said multiplications;
  (d) select a tailored offer for the first person from the plurality of the entertainment resources based on the determined desirability rankings, wherein the selected tailored offer comprises at least one of the entertainment resources having the highest desirability rankings;
  (e) select one of the display devices based on the location of the first person; and
  (f) send the selected tailored offer to the selected display device via the communication network and cause the selected display device to display the selected tailored offer.

19. The system of claim 18, wherein the entertainment resources comprise one or more of the following: games of chance, advertisements, and services.

20. The system of claim 18, wherein each resource metadata value comprises comprise one or more of the following:
  a genre of a game of chance,
  an indication of a presence of a bonus game of chance;
  an indication of a presence of multiple paylines, and
  an indication of a presence of a progressive game of chance.

21. The system of claim 18, wherein the identified at least one personal characteristic of the first person comprises one or more of the following:
  a number of times the first person has played a particular game of chance,
  a genre of games preferred by the first person,
  the first person's age,
  an indication of the first person's preference for a particular bonus game, and
  an indication of the first person's preference for games of chance having multiple paylines.

22. The system of claim 18, wherein for at least one demographic category, one of the at least one demographic characteristic associated with said at least one demographic category comprises historical game play data, interests data, preferences data for the first person, or a combination thereof.

23. The system of claim 18, wherein the selected display device is part of a gaming device and the selected tailored offer comprises one or more of: a game of chance and an advertisement.

24. The system of claim 18, wherein the location of the first person is a target location.

25. A server comprising:
  at least one processor; and
  at least one memory device that stores a plurality of instructions which, when executed by the at least one processor, cause the at least one processor to:
(A) receive personal information associated with multiple persons in a gaming establishment;
(B) store in a database:
  (a) said received personal information;
  (b) for each of a plurality of different entertainment resources, one or more resource metadata values that characterize said entertainment resource;
  (c) for each of a plurality of different demographic categories, at least one demographic characteristic associated with said demographic category; and
  (d) for each demographic category, for each resource metadata value of each entertainment resource, a resource weight representing a relevancy of said resource metadata value to said demographic category;
(C) receive an identification of at least one personal characteristic of a first one of the persons in the gaming establishment;
(D) receive a location of the first person within the gaming establishment; and
(E) for the first person, in real-time:
  (a) compare the identified at least one personal characteristic of the first person with the at least one demographic characteristic of one or more of the demographic categories;
  (b) based on said comparison, assign the first person to one of the demographic categories;
  (c) for each of a plurality of the entertainment resources, determine a desirability ranking for said entertainment resource by:
    (i) for each resource metadata value associated with said entertainment resource, multiplying said resource metadata value by the resource weight of the assigned demographic category associated with said resource metadata value; and
    (ii) summing the products of said multiplications;
  (d) select a tailored offer for the first person from the plurality of the entertainment resources based on the determined desirability rankings, wherein the selected tailored offer comprises at least one of the entertainment resources having the highest desirability rankings;
  (e) select one of a plurality of different devices based on the location of the first person; and
  (f) cause the selected device to provide the selected tailored offer.

26. The server of claim 25, wherein the entertainment resources comprise one or more of the following: games of chance, advertisements, and services.

27. The server of claim 25, wherein each resource metadata value comprises one or more of the following:
  a genre of a game of chance,
  an indication of a presence of a bonus game of chance,
  an indication of a presence of multiple paylines, and
  an indication of a presence of a progressive game of chance.

28. The server of claim 25, wherein the identified at least one personal characteristic of the first person comprises one or more of the following:

a number of times the first person has played a particular game of chance, a genre of games preferred by the first person, the first person's age, an indication of the first person's preference for a particular bonus game, and an indication of the first person's preference for games of chance having multiple paylines.

29. The server of claim 25, wherein for at least one demographic category, one of the at least one demographic characteristic associated with said at least one demographic category comprises historical game play data, interests data, preferences data for the first person, or a combination thereof.

30. The server of claim 25, wherein the selected device is a gaming machine and the selected tailored offer offering comprises one or more of: a game of chance and an advertisement.

31. The server of claim 25, wherein the location of the first person is a target location.

* * * * *